US012772142B2

(12) United States Patent
Horita

(10) Patent No.: US 12,772,142 B2
(45) Date of Patent: Oct. 20, 2026

(54) RELAY DEVICE, RELAY METHOD, AND COMMUNICATION SYSTEM

(71) Applicant: Sony Group Corporation, Tokyo (JP)

(72) Inventor: Koki Horita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 296 days.

(21) Appl. No.: 18/571,744

(22) PCT Filed: Feb. 2, 2022

(86) PCT No.: PCT/JP2022/003960
§ 371 (c)(1),
(2) Date: Dec. 19, 2023

(87) PCT Pub. No.: WO2023/276220
PCT Pub. Date: Jan. 5, 2023

(65) Prior Publication Data

US 2024/0298242 A1 Sep. 5, 2024

(30) Foreign Application Priority Data

Jun. 30, 2021 (JP) ................................ 2021-109633

(51) Int. Cl.
*H04W 40/22* (2009.01)
*H04W 40/12* (2009.01)
*H04W 40/18* (2009.01)

(52) U.S. Cl.
CPC .......... *H04W 40/22* (2013.01); *H04W 40/12* (2013.01); *H04W 40/18* (2013.01)

(58) Field of Classification Search
CPC .... H04L 45/302; H04W 40/12; H04W 40/18; H04W 40/22
See application file for complete search history.

(56) References Cited

U.S. PATENT DOCUMENTS 10,805,876 B1 * 10/2020 Parihar ................ H04W 60/00
2017/0134261 A1 5/2017 Seo
2017/0208540 A1 7/2017 Egner
2021/0176666 A1 6/2021 Ayadurai

FOREIGN PATENT DOCUMENTS

JP 2009-124367 A 6/2009
JP 2016-154319 A 8/2016
JP 2016-165072 A 9/2016
JP 2018-157280 A 10/2018

OTHER PUBLICATIONS

International Search Report and Written Opinion mailed on Apr. 5, 2022, received for PCT Application PCT/JP2022/003960 filed on Feb. 2, 2022, 7 pages including English Translation.

* cited by examiner

*Primary Examiner* — Brian P Cox
(74) *Attorney, Agent, or Firm* — XSENSUS LLP

(57) ABSTRACT

A relay device is connected to an upstream network via a plurality of communication paths and relays communication between the upstream network and a downstream network. The relay device includes a control unit. The control unit acquires communication status of at least one of the plurality of communication paths. The control unit selects one of the plurality of communication paths depending on the communication status. The control unit is connected to the upstream network by using the selected communication path.

16 Claims, 12 Drawing Sheets

{"Priority": "High", "Port":
"10080",
"metered_bearer": "true"
"throughput": "10Mbps"}

RELAY DEVICE, RELAY METHOD, AND COMMUNICATION SYSTEM

CROSS-REFERENCE TO RELATED APPLICATIONS

The present application is based on PCT filing PCT/JP2022/003960, filed Feb. 2, 2022, which claims priority from Japanese Patent Application No. 2021-109633, filed Jun. 30, 2021, the entire contents of each are incorporated herein by reference.

FIELD

The present disclosure relates to a relay device, a relay method, and a communication system.

BACKGROUND

In recent years, telework has become common. A network environment is an important factor in implementation of telework, and a more comfortable network environment is required. However, for example, in a joint residence such as an apartment, there is a problem that the network cannot be easily updated, and communication at home is easily affected by network traffic of another residence. Therefore, for example, in a joint residence, it is difficult to obtain a network environment (communication quality) suitable for telework.

A method for controlling communication quality of a network by performing priority (quality of service (QoS)) control of a plurality of traffic is known. In such a technology, communication quality is controlled by setting a high priority to traffic with a high priority (for example, VOIP call traffic), preferentially processing the traffic in a network queue, or shaping the traffic with a low priority.

CITATION LIST

Patent Literature

Patent Literature 1: JP 2018-157280 A

SUMMARY

Technical Problem

However, since priority control processing is best effort, there is no guarantee that traffic with high priority is always protected (always transmitted). In addition, for example, when a large amount of traffic with high priority flows into the network, such as a case where VOIP call is performed by a plurality of households, there is a risk that the band is filled with only traffic with high priority and the required network quality cannot be satisfied. Thus, it is desired to further improve the network environment.

Therefore, the present disclosure proposes a mechanism capable of further improving a network environment.

Note that the above problem or object is merely one of a plurality of problems or objects that may be solved or achieved by the plurality of embodiments disclosed in the present specification.

Solution to Problem

According to the present disclosure, a relay device is provided. The relay device is connected to an upstream network via a plurality of communication paths and relays communication between the upstream network and a downstream network. The relay device includes a control unit. The control unit acquires communication status of at least one of the plurality of communication paths. The control unit selects one of the plurality of communication paths depending on the communication status. The control unit is connected to the upstream network by using the selected communication path.

DESCRIPTION OF EMBODIMENTS

Figure 1:
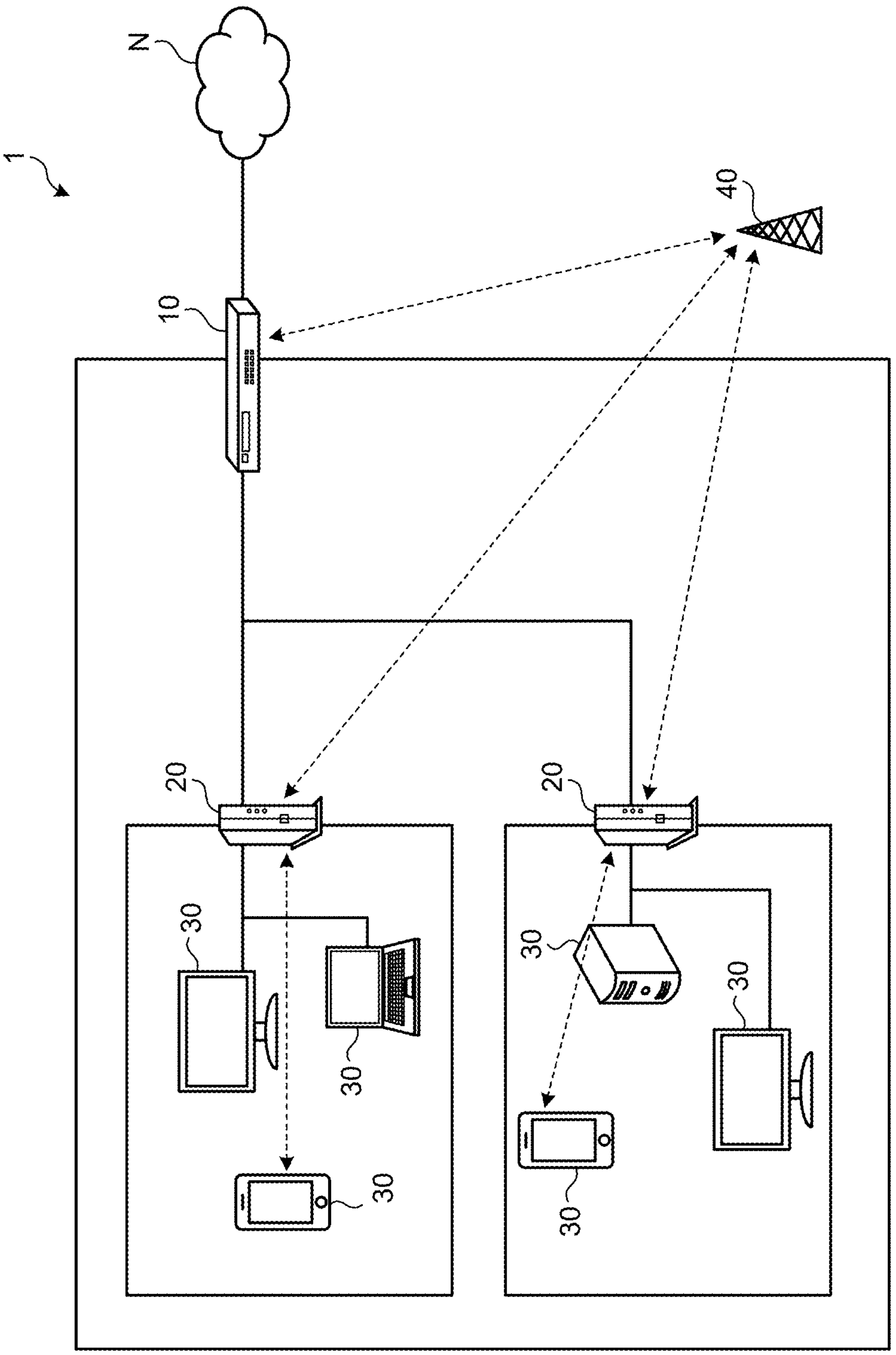
FIG. 1 is a diagram illustrating a configuration example of a communication system according to a first embodiment of the present disclosure.

Hereinafter, embodiments of the present disclosure are described in detail with reference to the accompanying drawings. Note that, in the present specification and the drawings, components having substantially the same functional configuration are denoted by the same reference numerals, and overlapping description is omitted.

One or a plurality of embodiments (including examples and modifications) described below can each be implemented independently. Meanwhile, at least some of the plurality of embodiments described below may be appropriately combined with at least some of other embodiments to be implemented. The plurality of embodiments may include novel features different from each other. Therefore, the plurality of embodiments may contribute to solving different objects or problems and can exhibit different effects.

<<1. Introduction>>

<1.1. Related Art>

As described above, for example, the spread of telework requires further improvement of the network environment. For example, in Patent Literature 1, QoS control is performed by preferentially processing traffic with high priority in a network queue or shaping traffic with low priority so that improvement of a network environment is achieved.

However, since the above-described QoS control is QoS control in a single network, when the band of the network is filled, there is a risk that the bit rate is lowered or the traffic is cut off even if the traffic has a high priority.

For example, JP 2015-27092 A discloses a technology for selecting an optimum communication path based on QoS of a plurality of communication paths. However, such a technology assumes a single service and does not assume a network in which a plurality of services are provided.

For example, in JP 2020-502948 A, a system sequentially transmits a burst of packets through a first network interface. The system also generates the bandwidth of the first network interface based on the timestamp and the size of the packet recorded when the packet is received at a receiving node. The system sequentially routes the data flow of the packet through the plurality of network connections based on the corresponding bandwidth. Thereby, the system reduces impact on transmission efficiency by the re-requirement process. However, in such a technology, the priority of the packet is not considered.

In the related art, it cannot be said that QoS control in a case where a plurality of services are provided using a plurality of communication paths is sufficiently considered. Thus, the related art has room for improvement in terms of further improving the network environment.

<1.2. Proposed Technology>

The relay device according to the proposed technology is connected to an upstream network via a plurality of communication paths. The relay device relays communication between the upstream network and a downstream network.

For example, the upstream network may be an external network such as a WAN, and the downstream network may be a network constructed for each household in a collective housing. The plurality of communication paths may include a network (for example, a local line including an optical line or local 5G) constructed in a collective housing. In this case, the relay device is, for example, an optical network unit (ONU). When the relay device is an ONU, the relay device is connected to a main distributing frame (MDF) board, and establishes a plurality of communication paths (for example, a wired local line and wireless local 5G), for example, with the MDF board.

The relay device acquires communication status of at least one (for example, a local line) of a plurality of communication paths and selects one of the plurality of communication paths according to the acquired communication status. The relay device is connected to the upstream network using the selected communication path.

As described above, the relay device according to the proposed technology of the present disclosure selects one of the plurality of communication paths in accordance with the communication status of the at least one of the plurality of communication paths. As a result, even when the band of one communication path is tight, the relay device can select another communication path to relay communication between the downstream network and the upstream network, and the network environment can be further improved.

Hereinafter, details of a communication system including the relay device are described in detail in each embodiment and modification.

2. First Embodiment

<2.1. Configuration Example of Communication System>

<2.1.1. Overall Configuration Example of Communication System>

FIG. 1 is a diagram illustrating a configuration example of a communication system 1 according to a first embodiment of the present disclosure. In the example illustrated in FIG. 1, the communication system 1 includes an MDF board 10, an ONU 20, a terminal device 30, and a base station 40. Note that, in the following drawings, wired communication is illustrated by a solid line, and wireless communication is illustrated by a dotted line, unless otherwise specified.

The MDF board 10 is a relay device that is provided in a collective housing such as an apartment, for example, and relays communication between a network constructed in each residence (hereinafter, also referred to as a home network or a local line) and an external network N outside the collective housing (an example of an upstream network. for example, WAN). The MDF board 10 is connected to the home network via the ONU 20 or the base station 40.

The ONU 20 is a relay device that is connected to the external network N via the MDF board 10 and relays communication between the home network and the external network N. The ONU 20 in FIG. 1 is connected to the terminal device 30 wirelessly or by wire.

In addition, the ONU 20 is connected to the external network N via the MDF board 10 by performing wired communication with the MDF board 10. The ONU 20 is connected to the external network N via the base station 40 by performing wireless communication with the base station 40.

As described above, the ONU 20 according to the present embodiment is connected to the external network N by using two communication paths, that is, a communication path via the MDF board 10 and a communication path via the base station 40.

The terminal device 30 is a client device disposed in each residence of the collective housing and used by a resident (user) in the residence. In the example of FIG. 1, for example, the terminal device 30 includes a television, a smartphone, a PC, and the like. Furthermore, the terminal device 30 may be various Internet of Things (IoT) terminals such as home appliances having a communication function.

Although FIG. 1 illustrates a case where the ONU 20 communicates with the terminal device 30 by direct wireless communication, the present disclosure is not limited thereto. For example, the ONU 20 may communicate with the terminal device 30 via a wireless router (not illustrated) disposed in a residence.

In this way, in the residence, the home network is constructed by at least one terminal device 30 and the ONU 20.

The base station 40 is, for example, a local 5G (or private 5G) base station which is a private 5G service available to residents of a collective housing. The communication system 1 may have a local 5G core network (not illustrated) in addition to the base station 40. The base station 40 is connected to the ONU 20 and the MDF board 10. In the example of FIG. 1, the ONU 20 communicates with the MDF board 10 via the local 5G including the base station 40.

Figure 2:
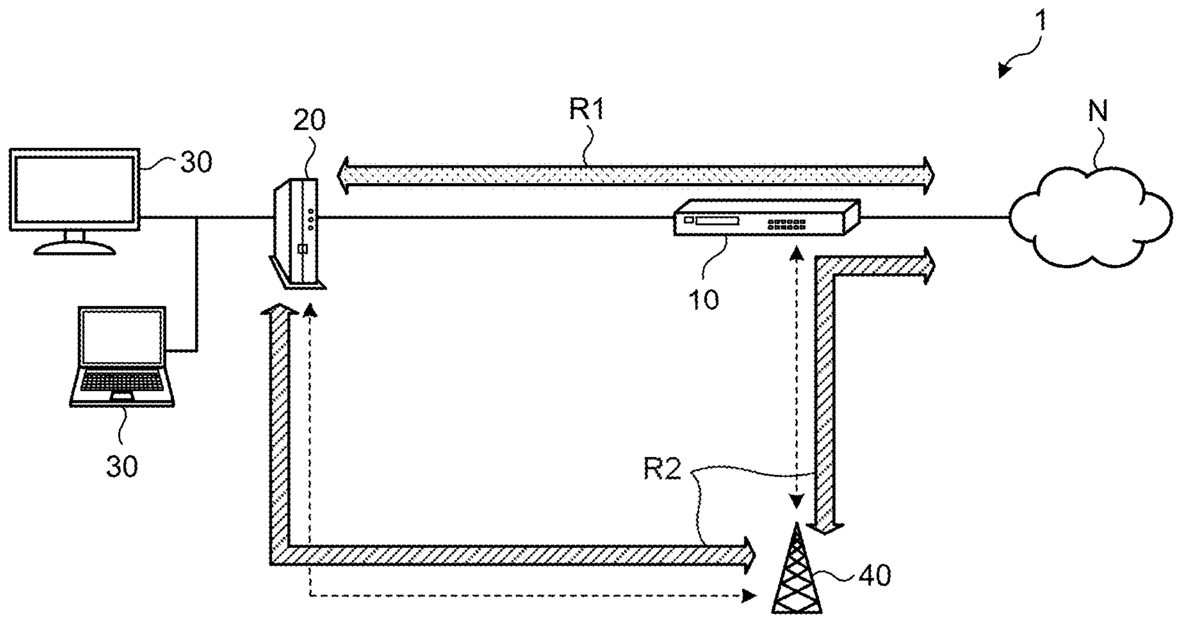
FIG. 2 is a diagram illustrating a communication path according to the first embodiment of the present disclosure.

Here, a plurality of communication paths used by the ONU 20 are described with reference to FIG. 2. FIG. 2 is a diagram illustrating the communication path according to the first embodiment of the present disclosure. In FIG. 2, some components are not illustrated.

As illustrated in FIG. 2, the ONU 20 is connected to the external network N by using a communication path R1 and a communication path R2.

The communication path R1 is, for example, a communication path of a wired network constructed in the collective housing. The ONU 20 is connected to the external network N by being connected to the MDF board 10 by using the communication path R1.

The communication path R2 is, for example, a communication path of a wireless network such as local 5G constructed in the collective housing. The ONU 20 is connected to the base station 40 by using the communication path R2. The base station 40 is connected to the external network N via the MDF board 10. In this manner, the ONU 20 is connected to the external network N via the base station 40 (that is, the local 5G) and the MDF board 10.

<2.1.2. MDF Board>

Figure 3:
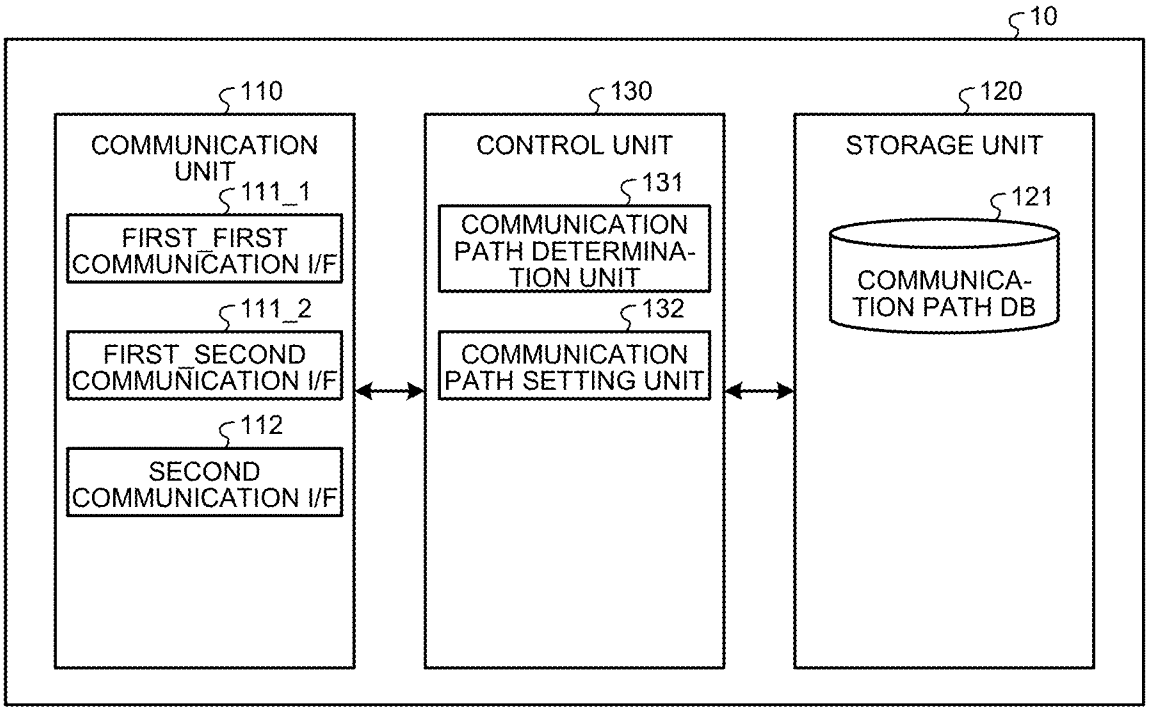
FIG. 3 is a block diagram illustrating a configuration example of an MDF board according to the first embodiment of the present disclosure.

FIG. 3 is a block diagram illustrating a configuration example of the MDF board 10 according to the first embodiment of the present disclosure. The MDF board 10 illustrated in FIG. 3 includes a communication unit 110, a storage unit 120, and a control unit 130.

The communication unit 110 is a communication interface for communicating with other devices. The communication unit 110 may be a network interface or a device connection interface. For example, the communication unit 110 may include a local area network (LAN) interface such as a network interface card (NIC) or may include a universal serial bus (USB) interface configured by a USB host controller, a USB port, or the like. In addition, the communication unit 110 may be a wired interface or a wireless interface.

The communication unit 110 functions as communication means of the MDF board 10. The communication unit 110 communicates with the ONU 20, the base station 40, and the external network N under the control of the control unit 130.

The communication unit 110 includes, for example, a first_first communication interface (I/F) 111.1, a first_second communication I/F 111.2, and a second communication I/F 112. The first_first communication I/F 111.1 is, for example, a communication interface for communication with the ONU 20. The first_second communication I/F 111.2 is, for example, a communication interface for communication with the base station 40. The second communication I/F 112 is, for example, a communication interface for communication with the external network N.

The storage unit 120 is a data readable/writable storage device such as a dynamic random access memory (DRAM), a static random access memory (SRAM), a flash memory, or a hard disk. The storage unit 120 functions as storage means of the MDF board 10.

The storage unit 120 includes, for example, a communication path database (DB) 121. The communication path DB 121 is a database that stores communication paths to the ONU 20. The communication path DB 121 is used when the control unit 130 determines which of the plurality of communication paths R1 and R2 is used to communicate with the ONU 20. For example, the communication path DB 121 is a routing table.

The control unit 130 is a controller that controls each unit of the MDF board 10. The control unit 130 is implemented by, for example, a processor such as a central processing unit (CPU) or a micro processing unit (MPU). For example, the control unit 130 is implemented by the processor executing various programs stored in the storage device inside the MDF board 10 using a random access memory (RAM) or the like as a work area. Note that the control unit 130 may be implemented by an integrated circuit such as an application specific integrated circuit (ASIC) or a field programmable gate array (FPGA). Any of the CPU, the MPU, the ASIC, and the FPGA can be regarded as a controller.

The control unit 130 includes a communication path determination unit 131 and a communication path setting unit 132. Each block (the communication path determination unit 131 and communication path setting unit 132) that configures the control unit 130 is a functional block indicating a function of the control unit 130. These functional blocks may be software blocks or hardware blocks. For example, each of the functional blocks described above may be one software module realized by software (including microprograms) or may be one circuit block on a semiconductor chip (die). Of course, each functional block may be one processor or one integrated circuit. A configuration method of the functional block is arbitrary. Note that the control unit 130 may be configured with a functional unit different from the above-described functional blocks.

The communication path determination unit 131 determines a communication path of data to be relayed to the ONU 20 based on communication path information stored in the communication path DB 121. The communication path information includes, for example, information that associates an application (for example, a call application, a video application, or a file transfer application) executed by the terminal device 30 with a communication path. Alternatively, the communication path information may include information that associates the type of data to be relayed (audio data or image data) with the communication path.

The communication path setting unit 132 writes the communication path information onto the communication path DB 121. The communication path setting unit 132 registers, for example, communication path information notified from the ONU 20 to the communication path DB 121. Alternatively, the communication path setting unit 132 may acquire communication path quality information notified from the ONU 20 and generate and register the communication path information based on the communication path quality information. Details of the communication path quality information are described below.

<2.1.3. ONU>

Figure 4:
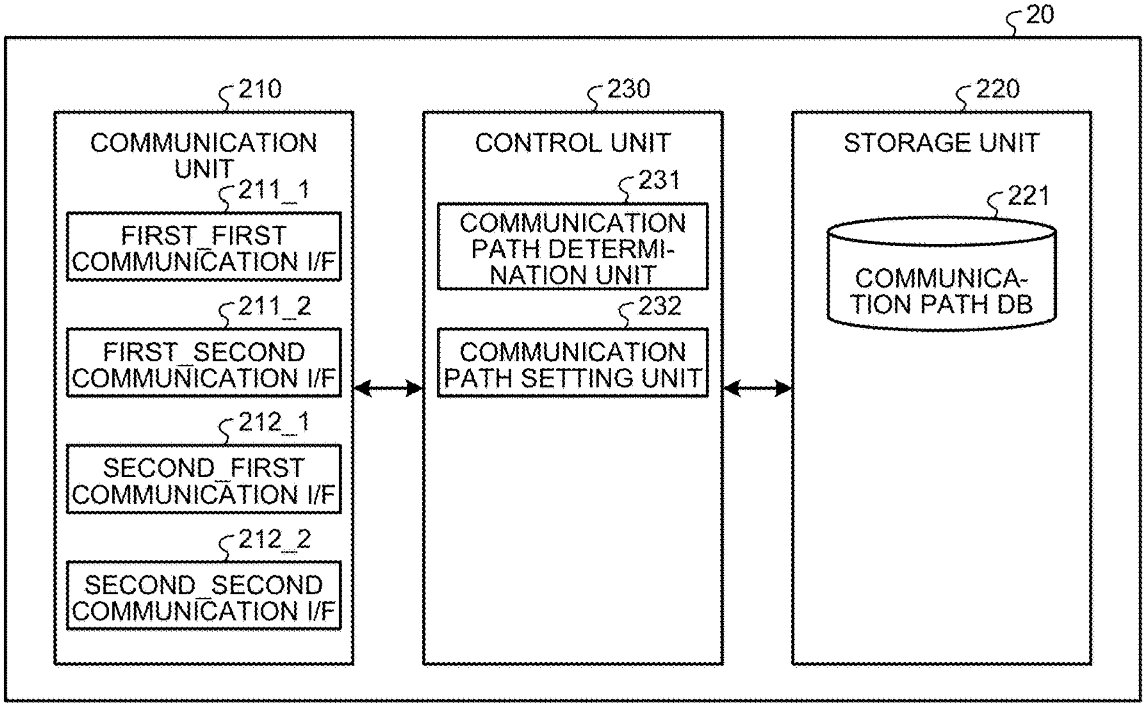
FIG. 4 is a block diagram illustrating a configuration example of an ONU according to the first embodiment of the present disclosure.

FIG. 4 is a block diagram illustrating a configuration example of the ONU 20 according to the first embodiment of the present disclosure. The ONU 20 illustrated in FIG. 4 includes a communication unit 210, a storage unit 220, and a control unit 230.

The communication unit 210 is a communication interface for communicating with other devices. The communication unit 210 may be a network interface or a device connection interface. For example, the communication unit 210 may include a local area network (LAN) interface such as a network interface card (NIC) or may include a universal serial bus (USB) interface configured by a USB host controller, a USB port, or the like. Furthermore, the communication unit 210 may be a wired interface or a wireless interface. The communication unit 210 may have functions of wireless local area network (LAN) communication such as WiFi (registered trademark) and mobile communication such as long term evolution (LTE) and 5G.

The communication unit 210 functions as communication means of the ONU 20. The communication unit 210 communicates with the MDF board 10, the base station 40, and the terminal device 30 under the control of the control unit 230.

The communication unit 210 includes, for example, a first_first communication I/F 211_1, a first_second communication I/F 211_2, a second_first communication I/F 212.1, and a second_second communication I/F 212.2. The first_first communication I/F 211_1 is, for example, a wired communication interface for wired communication with the MDF board 10. The first_second communication I/F 211_2 is, for example, a wireless communication interface for wireless communication with the base station 40. The second_first communication I/F 212.1 is, for example, a wired communication interface for wired communication with the terminal device 30. The second_second communication I/F 212.2 is, for example, a wireless communication interface for wireless communication with the terminal device 30.

The storage unit 220 is a data readable/writable storage device such as a dynamic random access memory (DRAM), a static random access memory (SRAM), a flash memory, or a hard disk. The storage unit 220 functions as storage means of the ONU 20.

The storage unit 220 includes, for example, a communication path database (DB) 221. The communication path DB 221 is a database that stores communication paths to the MDF board 10. The communication path DB 221 is used when the control unit 230 determines which of the plurality of communication paths R1 and R2 is used to communicate with the MDF board 10. For example, the communication path DB 221 is a routing table.

The control unit 230 is a controller that controls each unit of the ONU 20. The control unit 230 is implemented by, for example, a processor such as a central processing unit (CPU) or a micro processing unit (MPU). For example, the control unit 230 is implemented by a processor executing various programs stored in a storage device inside the ONU 20 using a random access memory (RAM) or the like as a work area. Note that the control unit 230 may be implemented by an integrated circuit such as an application specific integrated circuit (ASIC) or a field programmable gate array (FPGA). Any of the CPU, the MPU, the ASIC, and the FPGA can be regarded as a controller.

The control unit 230 includes a communication path determination unit 231 and a communication path setting unit 232. Each block (the communication path determination unit 231 and communication path setting unit 232) that configures the control unit 230 is a functional block indicating a function of the control unit 230. These functional blocks may be software blocks or hardware blocks. For example, each of the functional blocks described above may be one software module realized by software (including microprograms) or may be one circuit block on a semiconductor chip (die). Of course, each functional block may be one processor or one integrated circuit. A configuration method of the functional block is arbitrary. Note that the control unit 230 may be configured with a functional unit different from the above-described functional blocks.

The communication path determination unit 231 determines a communication path of data to be relayed to the MDF board 10 based on the communication path information stored in the communication path DB 221. The communication path determination unit 231 determines a communication path of data to be relayed to the MDF board 10 to determine a corresponding communication I/F. The communication path information includes, for example, information that associates an application (for example, a call application, a video application, or a file transfer application) executed by the terminal device 30 with a communication path. Alternatively, the communication path information may include information that associates the type of data to be relayed (audio data or image data) with the communication path.

The communication path setting unit 232 writes the communication path information onto the communication path DB 221. The communication path setting unit 232 generates and registers the communication path information based on, for example, the communication path quality information notified from the terminal device 30. Details of the communication path quality information are described below.

<2.1.4. Terminal Device>

Figure 5:
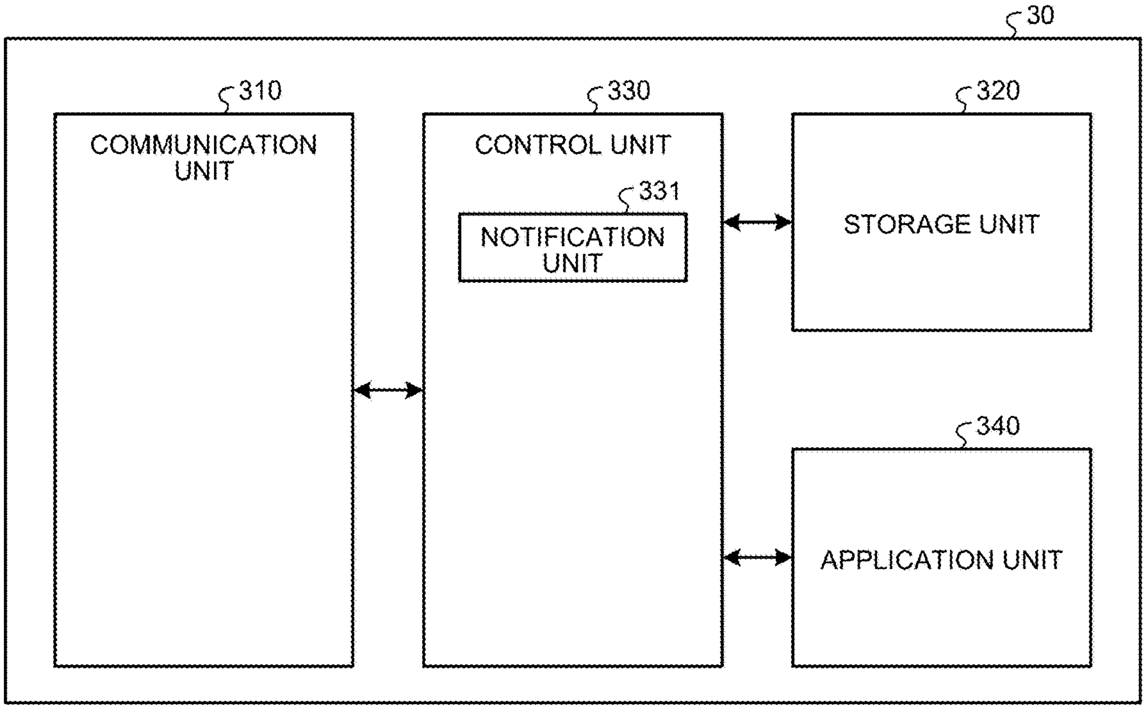
FIG. 5 is a block diagram illustrating a configuration example of a terminal device according to the first embodiment of the present disclosure.

FIG. 5 is a block diagram illustrating a configuration example of the terminal device 30 according to the first embodiment of the present disclosure. The terminal device 30 illustrated in FIG. 5 includes a communication unit 310, a storage unit 320, a control unit 330, and an application unit 340.

The communication unit 310 is a communication interface for communicating with other devices. The communication unit 310 may be a network interface or a device connection interface. For example, the communication unit 310 may include a local area network (LAN) interface such as a network interface card (NIC) or may include a universal serial bus (USB) interface configured by a USB host controller, a USB port, or the like. Furthermore, the communication unit 310 may be a wired interface or a wireless interface. The communication unit 310 may have functions of wireless local area network (LAN) communication such as WiFi (registered trademark) and mobile communication such as long term evolution (LTE) and 5G.

The communication unit 310 functions as communication means of the terminal device 30. The communication unit 310 communicates with the ONU 20 under the control of the control unit 330.

The storage unit 320 is a data readable/writable storage device such as a dynamic random access memory (DRAM), a static random access memory (SRAM), a flash memory, or a hard disk. The storage unit 320 functions as storage means of the terminal device 30.

The application unit 340 is one or more applications that provide a service to the terminal device 30. The application unit 340 is implemented, for example, by a program operating on a central processing unit (CPU) and provides various services such as a video call and a file transfer protocol (FTP) to a user who uses the terminal device 30.

The control unit 330 is a controller that controls each unit of the terminal device 30. The control unit 330 is implemented by, for example, a processor such as a central processing unit (CPU) or a micro processing unit (MPU). For example, the control unit 330 is implemented by a processor executing various programs stored in a storage device inside the terminal device 30 using a random access memory (RAM) or the like as a work area. Note that the control unit 330 may be implemented by an integrated circuit such as an application specific integrated circuit (ASIC) or a field programmable gate array (FPGA). Any of the CPU, the MPU, the ASIC, and the FPGA can be regarded as a controller.

The control unit 330 includes a notification unit 331. A block (notification unit 331) that configures the control unit 330 is a functional block indicating the function of the control unit 330. This functional block may be a software block or a hardware block. For example, the functional block described above may be one software module implemented by software (including microprograms) or may be one circuit block on a semiconductor chip (die). Of course, the functional block may be one processor or one integrated circuit. A configuration method of the functional block is arbitrary. Note that the control unit 330 may be configured with a functional unit different from the above-described functional blocks.

The notification unit 331 generates communication path quality requirement information and notifies the ONU 20 of the communication path quality requirement information. The notification unit 331 generates, for example, the communication path quality requirement information including the communication path quality corresponding to the application executed by the application unit 340. The notification unit 331 notifies the ONU 20 of the generated communication path quality requirement information, thereby requiring the ONU 20 to communicate the traffic related to the corresponding application with the quality included in the communication path quality requirement information.

For example, in the terminal device 30, various types of applications are executed by the application unit 340. For example, in a case where the terminal device 30 is a PC, an application such as FTP or video call can be executed in the terminal device 30. FTP is an application that is tolerant of delay but requires transmission and reception of a large amount of data. The video call application is an application that makes strict requirements for both delay and transmission and reception data capacity.

As described above, the network characteristics of the application executed by the application unit 340 are completely different for each application. Therefore, it is desirable to select an appropriate network that satisfies the requirements of each application.

The network characteristics (for example, communication quality) are designated by an application executed by the application unit 340. The notification unit 331 acquires characteristic information related to the network characteristics from the application unit 340. For example, the application unit 340 may pass the characteristic information to the notification unit 331 as an argument when the program opens the socket or may pass a network requirement script indicating the characteristic information to the notification unit 331.

The notification unit 331 notifies the ONU 20 of information related to the application executed by the application unit 340 and the communication quality (for example, characteristic information) required by the corresponding application as communication path quality requirement information. For example, when the video call application is executed by the application unit 340, the notification unit 331 notifies the communication path quality requirement information to request the ONU 20 to preferentially handle the traffic of a video notification application.

The notification unit 331 notifies the communication path quality requirement information by using, for example, DiffServ of the IP header. Alternatively, the notification unit 331 may notify the communication path quality requirement information by using the L2 VLAN tag. Furthermore, for example, a file in a JSON format (communication path quality requirement information) may be sent by using a control path established with the ONU 20.

<2.2. Example of Communication Path Quality Requirement Information>

Figures 6, 7:
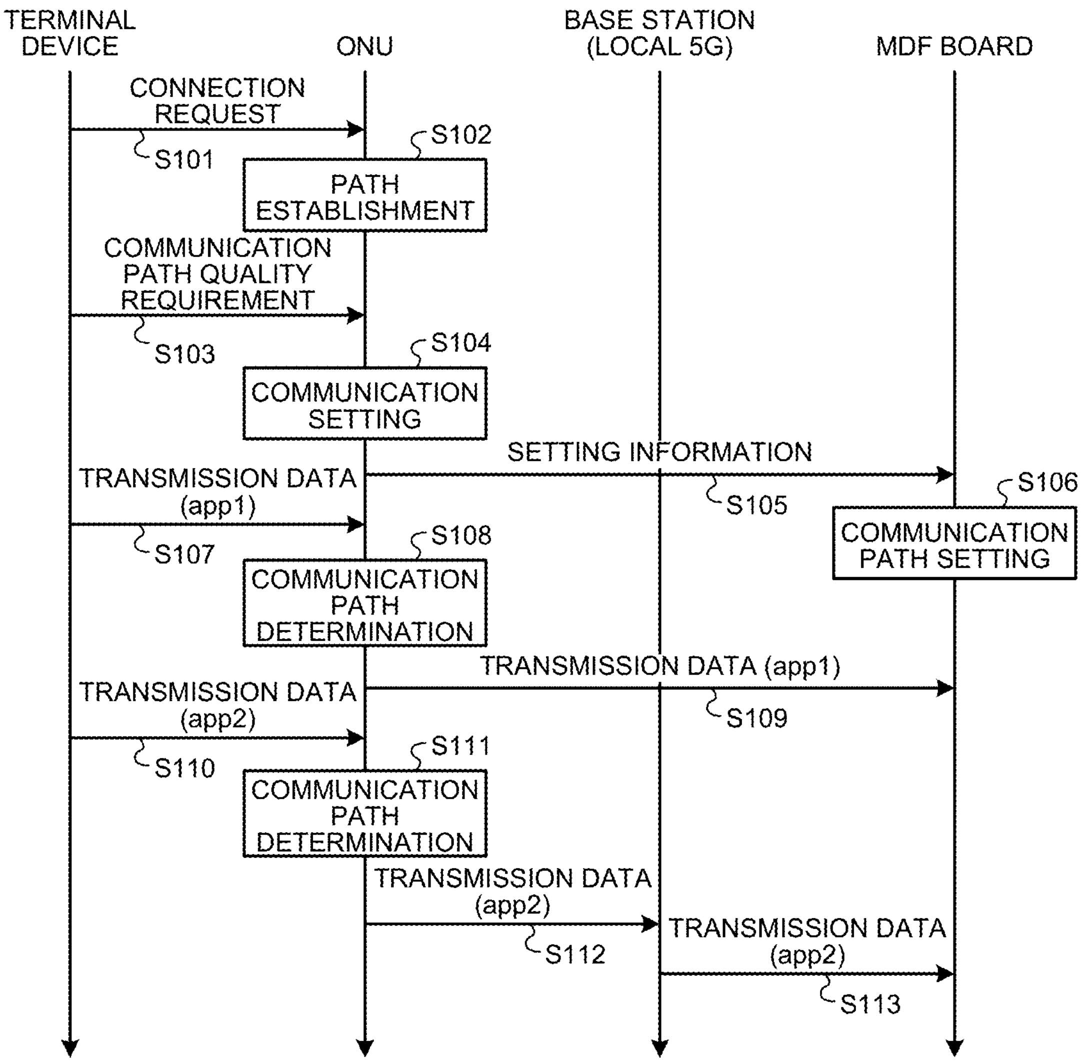
FIG. 6 is a diagram illustrating an example of communication path quality requirement information according to an embodiment of the present disclosure.
FIG. 7 is a sequence diagram illustrating an example of communication processing according to the first embodiment of the present disclosure.

Here, an example of the communication path quality requirement information in a JSON format is described with reference to FIG. 6. FIG. 6 is a diagram illustrating an example of the communication path quality requirement information according to an embodiment of the present disclosure.

For example, in the local 5G described above, there is a case where a usage fee for using the service of the local 5G is incurred, for example, according to the traffic amount. For example, if the local 5G is used, a usage fee may be incurred in exchange for ensuring a certain communication quality.

The notification unit 331 generates the communication path quality requirement information on the assumption that communication is performed even if a charging bearer, such as the local 5G, in which a usage fee is generated but the communication quality is guaranteed, is used for traffic that requires a low delay and a large capacity, such as a television call application. In the example of FIG. 6, the notification unit 331 generates the communication path quality requirement information including the fact that the charging bearer may be used by setting "metered_bearer" to "true".

The communication path quality requirement information illustrated in FIG. 6 may include, for example, a minimum throughput ("throughput", designated as "10 Mbps" in FIG. 6) and a priority ("Priority" designated as "High" in FIG. 6) in addition to the information related to the charging bearer described above. Further, the communication path quality requirement information may include information related to a specific port number ("Port" designated as "10080" in FIG. 6) and a delay amount (not illustrated, for example, "100 ms or less").

The notification unit 331 includes the communication path quality requirement information in, for example, a control packet and transmits the communication path quality requirement information to the ONU 20.

After establishing a control path with the ONU 20, the notification unit 331 notifies the ONU 20 of the communication path quality requirement information at an arbitrary timing. Examples of the arbitrary timing include a timing at which an application executed by the terminal device 30 changes and a timing at which the terminal device 30 is connected to the ONU 20.

The communication path setting unit 232 of the ONU 20 described above sets a routing rule based on the received communication path quality requirement information and describes the routing rule in the communication path DB 221.

For example, the communication path setting unit 232 selects a communication path (for example, the communication path R1 of a fixed line using a local line in a collective housing) of which the communication quality (for example, band) is not guaranteed although the cost is low as the communication path of the traffic set to low priority in the communication path quality requirement information.

On the other hand, the communication path setting unit 232 selects an expensive communication path (for example, the communication path R2 of local 5G constructed in the collective housing) with high stability and guaranteed communication quality (for example, band) as the communication path of the traffic set with high priority in the communication path quality requirement information.

Note that, for example, in a case where the use of the charging bearer is not permitted (for example, a metered_bearer of the communication path quality requirement information is "false") even in the traffic set with high priority, the communication path setting unit 232 may select the communication path R1 as the communication path of the traffic.

The communication path setting unit 232 notifies the MDF board 10, for example, of the determined routing rule. The MDF board 10 describes the received routing rule in the communication path DB 121. As a result, the ONU 20 can select a communication path (that is, the communication I/F corresponding to the communication path) according to the priority of traffic in the communication between the ONU 20 and the MDF board 10, and the network environment in the collective housing can be further improved.

<2.3. Communication Processing>

Next, an example of communication processing according to the first embodiment of the present disclosure is described with reference to FIG. 7. FIG. 7 is a sequence diagram illustrating an example of the communication processing according to the first embodiment of the present disclosure.

As illustrated in FIG. 7, the terminal device 30 transmits, to the ONU 20, a connection request for establishing a control path for communication path control with the ONU 20 (step S101). For example, when the ONU 20 is set as its own default gateway, the terminal device 30 makes a connection request for establishing a control path to the ONU 20.

The ONU 20 establishes a control path in response to the requirement (S102). Note that the communication path used to establish the control path may be a communication path (for example, a wireless LAN or a wired cable) actually used for data communication between the terminal device 30 and the ONU 20 or may be another communication path (for example, Bluetooth (registered trademark)).

The terminal device 30 transmits the communication path quality requirement information to the ONU 20 at the arbitrary timing described above to perform the communication path quality requirement (step S103).

The ONU 20 sets a communication path based on the received communication path quality requirement information (step S104). For example, the ONU 20 sets the communication path of the traffic of an application app1 set with low priority to the communication path R1 and sets the communication path of the traffic of an application app2 set with high priority to the communication path R2.

The ONU 20 notifies the MDF board 10 of the communication path information on the set communication path (step S105). The MDF board 10 sets a communication path based on the received communication path information (step S106).

Thereafter, for example, it is assumed that the application app1 is executed by the terminal device 30 to generate transmission data. In this case, the terminal device 30 transmits the transmission data (app1) to the ONU 20 (step S107).

The ONU 20 determines a communication path of the received transmission data (app1) (step S108). For example, the ONU 20 determines the communication path of the transmission data (app1) to the communication path R1. The ONU 20 transmits the transmission data (app1) to the MDF board 10 based on the determined communication path R1 (step S109).

In addition, for example, it is assumed that the application app2 is executed by the terminal device 30 to generate transmission data. In this case, the terminal device 30 transmits the transmission data (app2) to the ONU 20 (step S110).

The ONU 20 determines a communication path of the received transmission data (app2) (step S111). For example, the ONU 20 determines the communication path of the transmission data (app2) to the communication path R2. The ONU 20 transmits the transmission data (app2) to the MDF board 10 via the base station 40 (local 5G) based on the determined communication path 2 (step S112).

Although not illustrated in FIG. 7, the control path establishment processing is also performed between the ONU 20 and the MDF board 10. For example, between the ONU 20 and the MDF board 10, a notification channel is created when the ONU 20 is activated.

More specifically, the ONU 20 transmits a connection request for establishing a control path to the MDF board 10 at the time of activation. The MDF board 10 receives the connection request and establishes the control path. At this time, the ONU 20 may be authenticated and authorized.

3. Second Embodiment

In the first embodiment described above, the communication path of data is determined according to the communication path set by the ONU 20 based on the communication path quality requirement information. That is, in the first embodiment, the ONU 20 or the MDF board 10 statically determines a communication path of data and performs data routing according to a rule always determined according to a type of an application or the like, but the present disclosure is not limited thereto. For example, in a case where there is a risk that the communication quality required by the terminal device 30 cannot be satisfied, the ONU 20 or the MDF board 10 may switch the communication path. Such a case is described as a second embodiment.

<3.1. Configuration Example of ONU>

Figure 8:
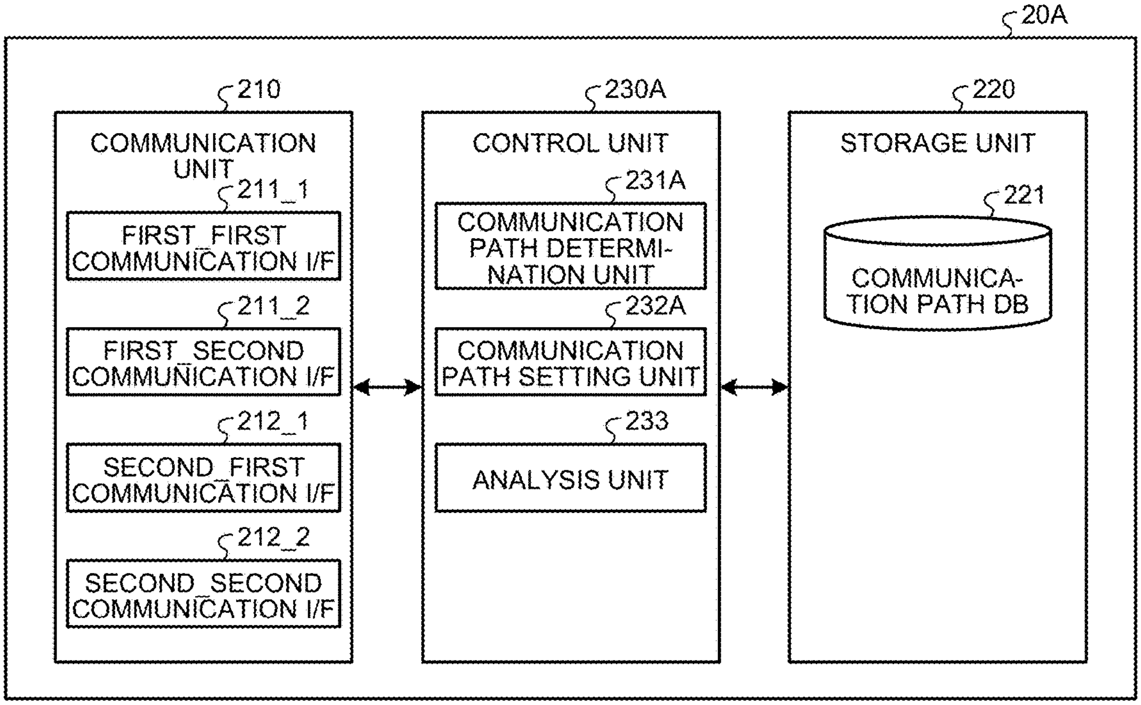
FIG. 8 is a block diagram illustrating a configuration example of an ONU according to a second embodiment of the present disclosure.

FIG. 8 is a block diagram illustrating a configuration example of an ONU 20A according to the second embodiment of the present disclosure. A control unit 230A of an ONU 20A illustrated in FIG. 8 is different from the ONU 20 in FIG. 5 in that a communication path determination unit 231A, a communication path setting unit 232A, and an analysis unit 233 are included.

The analysis unit 233 acquires the communication status of the upstream network by predicting and analyzing the communication status of the upstream network. The communication path setting unit 232A sets a routing rule according to the communication status, and the communication path determination unit 231A selects a communication path based on the determined routing rule. As a result, the ONU 20A can select a communication path according to the communication status of the upstream network.

For example, the analysis unit 233 monitors a packet counter of a packet transmitted to and received from each terminal device 30 accommodated in the ONU 20 and a packet counter of an interface on the MDF board 10 side (wide area network (WAN) side). The analysis unit 233 predicts congestion (communication status) of the upstream network (local line) based on the monitoring results of these packet counters.

The analysis unit 233 collects the counter of L2 and/or the counter of L3 from the counter of the I/Fs (for example, the first_first and first_second communication I/Fs 211_1 and 211_2) connected to the terminal device 30. In addition, the analysis unit 233 collects the counter of L2 and/or the counter of L3 from the counter of the I/F (for example, second_first communication I/F 212.1) connected to the MDF board 10.

The analysis unit 233 predicts congestion of a communication path (local line) with the MDF board 10 based on the collected information to acquire a communication status.

Figure 9:
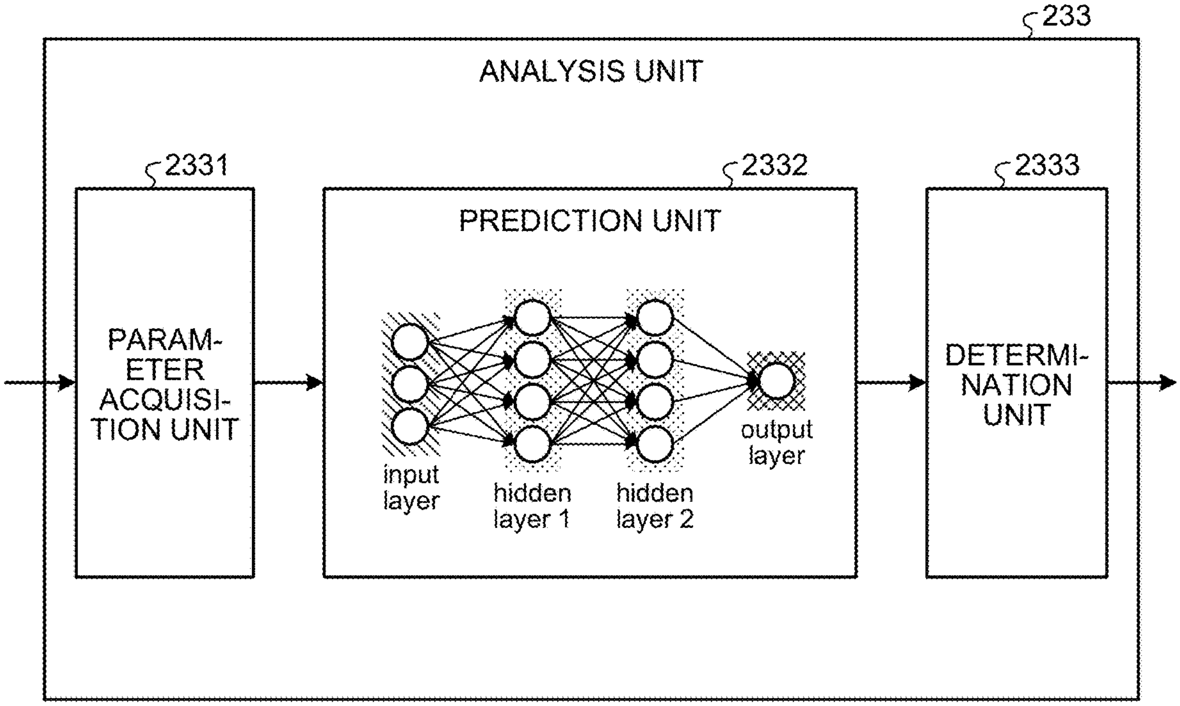
FIG. 9 is a block diagram illustrating a configuration example of an analysis unit according to the second embodiment of the present disclosure.

FIG. 9 is a block diagram illustrating a configuration example of the analysis unit 233 according to the second embodiment of the present disclosure. The analysis unit 233 illustrated in FIG. 9 includes a parameter acquisition unit 2331, a prediction unit 2332, and a determination unit 2333.

The parameter acquisition unit 2331 acquires a communication parameter to be an input parameter group of the prediction unit 2332. For example, the parameter acquisition unit 2331 acquires the communication parameter from the communication unit 210. An example of the input parameter group is described below.

The prediction unit 2332 receives the input parameter group acquired by the parameter acquisition unit 2331 as an input and outputs the prediction result of the communication status to the determination unit 2333 as an output. The prediction unit 2332 includes, for example, a predictor and predicts a communication status using the predictor.

Here, the predictor is generated in advance, for example, by learning using parameters at the time of past communication.

In addition to the packet counter described above, the following parameters are provided as parameters used for input of the predictor.

- Throughput
- Packet queue length
- Error value of transmission control protocol (TCP)
- Number of times of retransmission
- Throughput per application
- Round trip time (RTT) for specific host
- Error rate of internet control message protocol (ICMP)

In addition to the above-described parameters, for example, the following parameters and the like may be acquired from the MDF board 10.

- Packet counter
- Error
- Throughput of I/F (for example, the first_first communication I/F 111.1 and the second communication I/F 112 (see FIG. 3))
- Packet queue length
- Result of trace route
- Speed of link
- Minimum bandwidth
- Reliability
- Load
- Minimum maximum transmission unit (MTU)

Note that these parameters can be obtained from the MDF board 10 by using a control path established between the ONU 20 and the MDF board 10.

In addition, the predictor takes a metric of expected communication quality (for example, throughput or a delay amount) as a correct answer label and learns a regression model for predicting the value. Alternatively, the predictor may learn a classification problem that classifies a case where communication deteriorates and a case where communication does not deteriorate, for example, assuming that a case where the required throughput is not satisfied is “1” and a case where the required throughput is satisfied is “0”.

Note that the model of the predictor illustrated in FIG. 9 is an example, and various models can be used. The model used as the predictor may be, for example, a recurrent neural network (RNN) including a long short term memory (LSTM) or may be simple deep learning. The model to be used may be a model expressed by a simple linear polynomial.

Furthermore, the parameter acquisition unit 2331 may acquire the congestion status of the POP or the congestion status of the office building itself, which is the connection point with the ISP, from the MDF board 10 as an input of the predictor of the prediction unit 2332.

The determination unit 2333 acquires the congestion status predicted by the prediction unit 2332 and determines whether the communication path quality required by the terminal device 30 can be satisfied based on the congestion status as the prediction result. When it is determined that the communication path quality is not satisfied, the determination unit 2333 requires the communication path setting unit 232A to rewrite (update) the communication path setting.

Note that the analysis unit 233 performs these analyses (prediction and determination), for example, at a predetermined cycle.

The description returns to FIG. 8. The communication path setting unit 232A updates the communication path setting according to the determination result of the determination unit 2333.

For example, it is assumed that the determination unit 2333 determines that congestion does not occur and the communication path quality required by the terminal device 30 is satisfied. In this case, for example, the communication path setting unit 232A sets a routing rule that uses a local line (selects the communication path R1) and writes the routing rule onto the communication path DB 221.

Meanwhile, it is assumed that the determination unit 2333 determines that congestion occurs and the communication path quality required by the terminal device 30 is not satisfied. In this case, for example, the communication path setting unit 232A sets a routing rule that does not use a local line via the local 5G (selects the communication path 2) and writes the routing rule onto the communication path DB 221.

The analysis by the analysis unit 233 and the communication path setting by the communication path setting unit 232A may be performed for each application of the terminal device 30. Alternatively, the ONU 20 may perform analysis and communication path setting on all the terminal devices 30 to be accommodated. In this case, when the predetermined communication path quality is not satisfied, the ONU 20 determines that congestion has occurred and updates the communication path settings of all the terminal devices 30 to be accommodated. When the predicted communication path quality satisfies the communication path quality requirement from the terminal device 30, the ONU 20 sets the communication path of the communication of the terminal device 30 to the local line (communication path R1). Meanwhile, when the predicted communication path quality does not satisfy the communication path quality requirement from the terminal device 30, the ONU 20 sets the communication path of the communication of the terminal device 30 to the local 5G (communication path 2).

The communication path determination unit 231A determines the communication path such that the transmission data from the terminal device 30 is transmitted through the communication path set by the communication path setting unit 232A. For example, when the communication status of the local line of the upstream network satisfies the communication path quality required by the terminal device 30, the communication path determination unit 231A determines the local line (communication path R1) as the communication path of the transmission data. Meanwhile, when the communication status of the local line of the upstream network does not satisfy the communication path quality required by the terminal device 30, the communication path determination unit 231A determines the communication path R2 (local 5G) other than the corresponding local line (communication path R1) as the communication path of the transmission data.

As described above, the local 5G may incur a charge when used. Therefore, the ONU 20 according to the present embodiment predicts the communication status and switches the communication path to the local 5G when it is determined that the communication status does not satisfy the communication path quality requirement of the terminal device 30 as a result of the prediction. As a result, the ONU 20 can further improve the network environment while suppressing an increase in cost (charging).

<3.2. Communication Processing>

Figure 10:
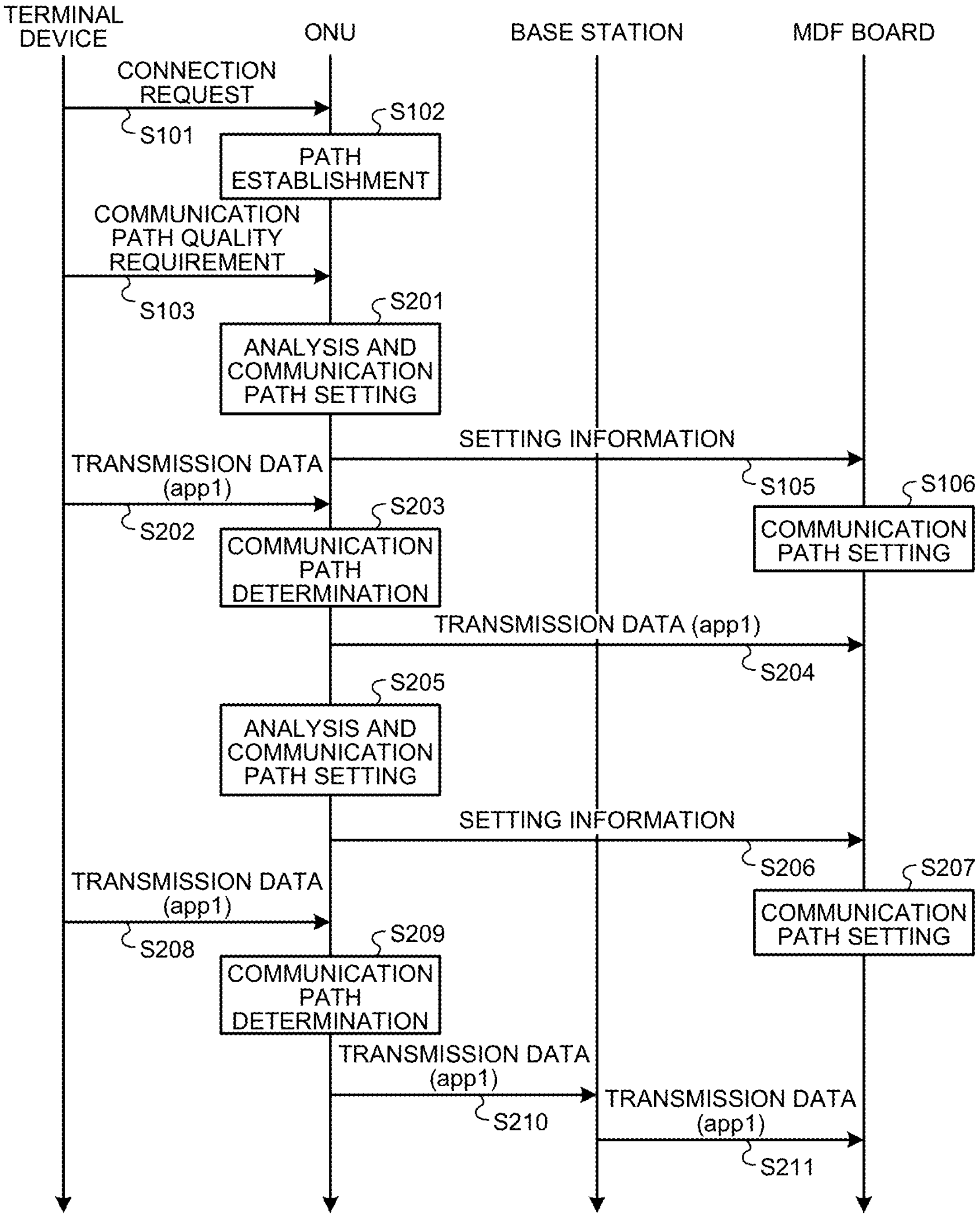
FIG. 10 is a sequence diagram illustrating an example of communication processing according to the second embodiment of the present disclosure.

FIG. 10 is a sequence diagram illustrating an example of the communication processing according to the second embodiment of the present disclosure. Note that the same pieces of processing as those in FIG. 7 are denoted by the same reference numerals, and description thereof is omitted.

The ONU 20 that has acquired the communication path quality requirement analyzes the communication status of the local line and performs communication path setting according to the analysis result (step S201). Here, it is assumed that the local line is not congested and the communication status of the local line satisfies the communication path quality requirement from the terminal device 30. In this case, the ONU 20 selects the local line (communication path R1).

Thereafter, for example, it is assumed that the application app1 is executed by the terminal device 30 to generate transmission data. In this case, the terminal device 30 transmits the transmission data (app1) to the ONU 20 (step S202).

The ONU 20 determines a communication path of the received transmission data (app1) (step S203). Here, the ONU 20 determines the communication path of the transmission data (app1) to the communication path R1. The ONU 20 transmits the transmission data (app1) to the MDF board 10 based on the determined communication path by using the communication path R1 (step S204).

The ONU 20 analyzes a communication status and sets a communication path (step S205). Such analysis and communication path setting are performed, for example, at a predetermined cycle.

For example, it is assumed that the ONU 20 analyzes that the local line is congested and determines that the communication status of the local line does not satisfy the communication path quality requirement from the terminal device 30. In this case, the ONU 20 sets the communication path according to the communication path quality requirement of the terminal device 30. For example, when the communication status satisfies the communication path quality required by the terminal device 30, the ONU 20 selects the local line (communication path R1). For example, when the communication status does not satisfy the communication path quality required by the terminal device 30, the ONU 20 selects the local 5G (communication path R2). Here, it is assumed that the communication status does not satisfy the communication path quality required by the terminal device 30, and the ONU 20 selects the local 5G (communication path R2).

In addition, the ONU 20 transmits the setting information related to the communication path set in step S205 to the MDF board 10 (step S206). The MDF board 10 performs communication path setting based on the acquired setting information (step S207).

In this case, the transmission data (app1) generated by the terminal device 30 executing the application app1 is transmitted to the ONU 20 (step S208), and the communication path is determined by the ONU 20 (step S209). Here, the communication path via the local 5G is determined.

Therefore, the ONU 20 transmits the transmission data (app1) to the base station 40 (step S210). The base station 40 transmits the received transmission data (app1) to the MDF board 10 via the local 5G (step S211).

As described above, according to the second embodiment of the present disclosure, the ONU 20 relays data of the same application app1 through different communication paths depending on the communication status of the local line. Accordingly, the communication system 1 can further improve the network environment.

4. Third Embodiment

In the second embodiment described above, the ONU 20 predicts the communication status, but the present disclosure is not limited thereto. For example, the MDF board 10 may predict the communication status. Such a case is described as a third embodiment.

<4.1. Configuration Example of MDF Board>

Figure 11:
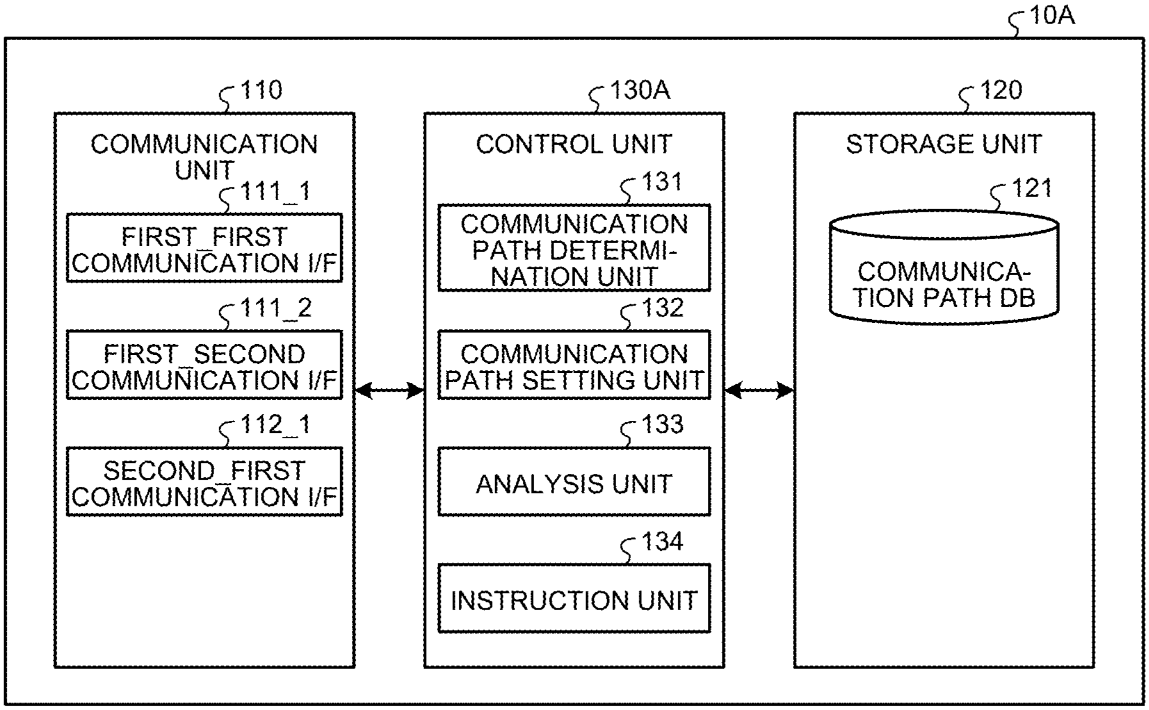
FIG. 11 is a block diagram illustrating a configuration example of an MDF board according to a third embodiment of the present disclosure.

FIG. 11 is a block diagram illustrating a configuration example of an MDF board 10A according to the third embodiment of the present disclosure. The MDF board 10A illustrated in FIG. 11 is different from the MDF board 10 illustrated in FIG. 4 in that an analysis unit 133 and an instruction unit 134 are included.

The analysis unit 133 observes the packet counter flowing to the I/F (second communication I/F 112) on the upstream side of the MDF board 10A. The analysis unit 133 analyzes and monitors, based on the observation result, whether the throughput of the traffic flowing from each house (the ONU 20) on the downstream side exceeds the upper limit throughput on the upstream side (WAN). When the traffic amount on the downstream side is likely to exceed the throughput on the WAN side, the analysis unit 133 notifies the instruction unit 134 of the fact.

Upon acquiring the notification from the analysis unit 133, the instruction unit 134 broadcasts throughput information indicating that the upper limit throughput is reached to the ONU 20. The instruction unit 134 may notify each ONU 20 of the throughput information by unicast.

The ONU 20 that has received the throughput information adjusts the traffic by, for example, throttling a flow using a large amount of traffic and limiting the flow rate.

For example, the ONU 20 reduces the traffic amount flowing into the MDF board 10A by throttling a flow of downloading an update file of a game, an OS, or the like. Meanwhile, throttling is not performed for a flow with high priority such as a flow of a video call.

As described above, the ONU 20 does not perform the throttling uniformly for all the flows but performs the throttling according to the communication quality required from the terminal device 30 and the priority.

In addition, the ONU 20 may perform throttling on the traffic and also transmit a communication interruption request to the terminal device 30. Upon receiving the communication interruption request, the terminal device 30 inquires of the user whether to interrupt the traffic, for example, via the application unit 340 and terminates or postpones the flow in a case where permission is obtained from the user.

When receiving the throughput information indicating that the traffic amount of the local line is likely to exceed the throughput on the WAN side even if the traffic is adjusted such as throttling or communication interruption, the ONU 20 updates the communication path setting. For example, the ONU 20 sets a routing rule of traffic according to a communication path quality requirement from the terminal device 30.

<4.2. Communication Processing>

Figure 12:
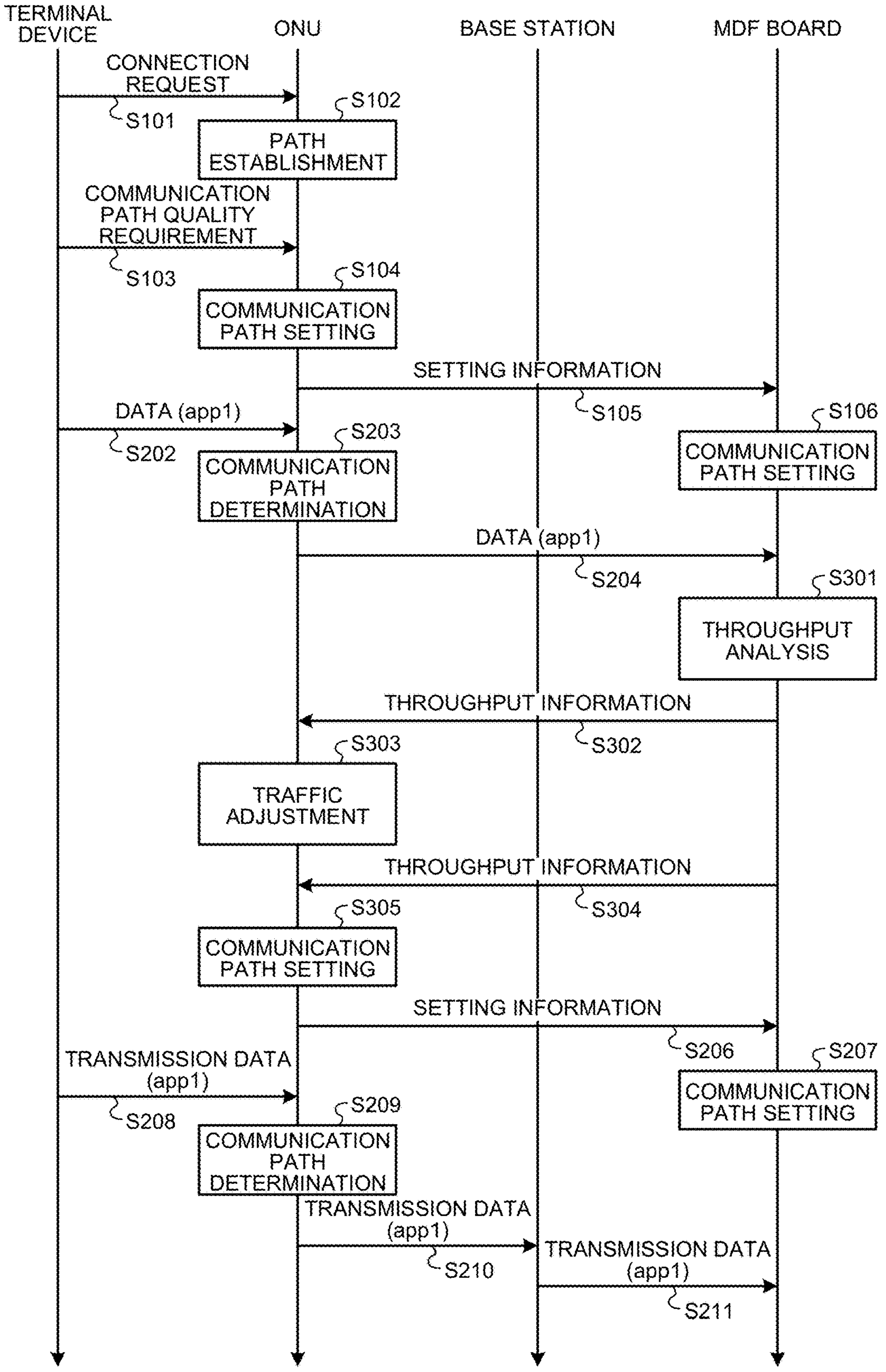
FIG. 12 is a sequence diagram illustrating an example of communication processing according to the third embodiment of the present disclosure.

FIG. 12 is a sequence diagram illustrating an example of the communication processing according to the third embodiment of the present disclosure. Note that the same pieces of processing as those in FIGS. 7 and 10 are denoted by the same reference numerals, and description thereof is omitted.

When analyzing that the traffic amount of the local line is likely to exceed the throughput on the WAN side (step S301), the MDF board 10A notifies the ONU 20 of the throughput information (step S302).

The ONU 20 that has acquired the throughput information first adjusts traffic (step S303). Even when the traffic is adjusted, if the throughput information is received from the MDF board 10A (step S304), the ONU 20 sets the communication path (step S305). For example, the ONU 20 performs communication path setting so as to switch the communication path of the traffic that cannot satisfy the communication path quality requirement of the terminal device 30 on the local line to the communication path R2 via the local 5G.

As a result, for example, the transmission data (app1) from the terminal device 30 is transmitted to the MDF board 10A via the base station 40 (local 5G).

Here, the communication path is set after the ONU 20 adjusts the traffic, but the present disclosure is not limited thereto. For example, even if the ONU 20 sets a communication path and relays important traffic through a communication path different from the local line, the ONU 20 may adjust the traffic when the traffic amount is not sufficiently reduced.

As described above, in the present embodiment, the ONU 20 sets the communication path according to the result of monitoring the throughput on the WAN side by the MDF board 10A. As a result, the ONU 20 can dynamically set the communication path according to the actual communication status and can further improve the network environment.

<<5. First Modification>>

In the first embodiment described above, the ONU 20 performs static communication path setting, and in the second and third embodiments, the ONU 20 performs dynamic communication path setting, but the present disclosure is not limited thereto. For example, the ONU 20 may perform both static communication path setting and dynamic communication path setting.

For example, the ONU 20 may switch between performing static communication path setting and performing dynamic communication path setting depending on the application. For example, the ONU 20 performs static communication path setting such that traffic of very important applications (an example of the first traffic) is always communicated via the local 5G (the communication path R2, an example of the first communication path), and performs dynamic communication path setting for other applications. Specifically, the ONU 20 selects a local line (the communication path R1, an example of the second communication path) in a case where the communication status satisfies the communication path quality required by the terminal device 30 in the traffic with high priority (an example of the second traffic). For example, when the communication status does not satisfy the communication path quality required by the terminal device 30, the ONU 20 selects the local 5G (the communication path R2, an example of the first communication path) for communication of traffic with high priority.

For example, the ONU 20 may switch between performing dynamic communication path setting and performing static communication path setting based on the communication path quality requirement information. The ONU 20 may switch between performing dynamic communication path setting and performing static communication path setting based on an instruction from a user.

<<6. Second Modification>>

In the first to third embodiments and the first modification described above, the MDF boards 10 and 10A communicate with the ONU 20 via the local line (the communication path R1) and the local 5G (the communication path R2), but the plurality of communication paths are not limited to the above-described communication paths.

Figure 13:
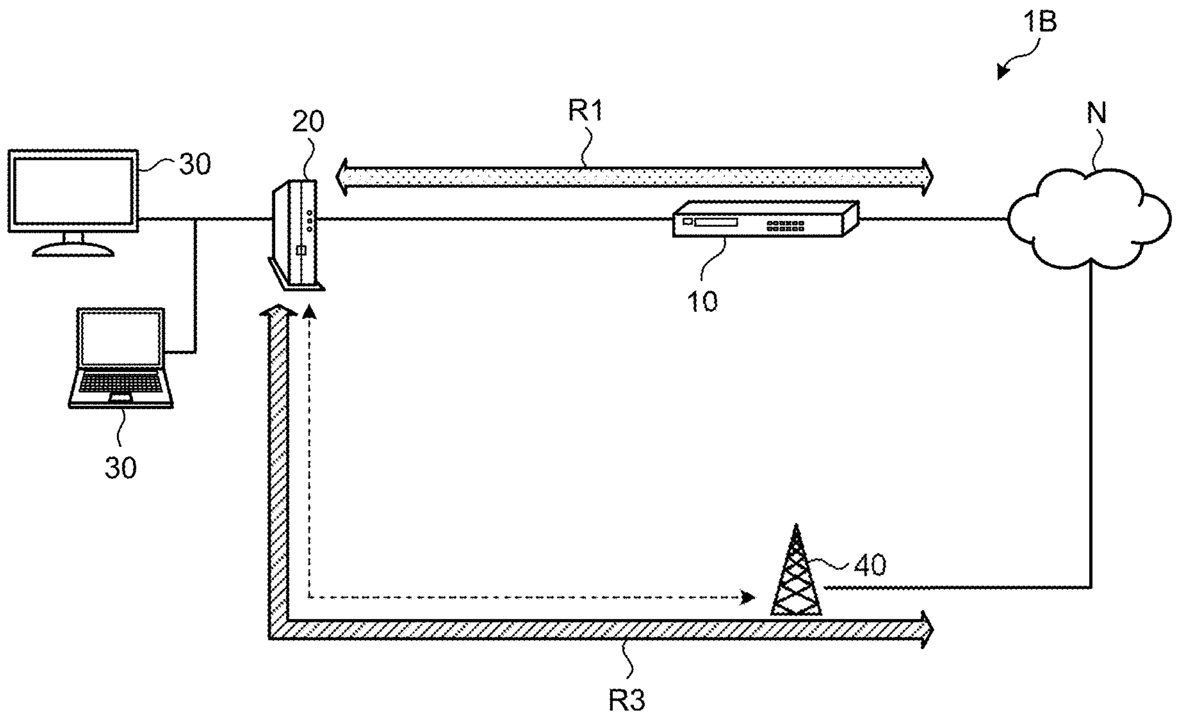
FIG. 13 is a diagram illustrating an example of a communication path according to a second modification of the present disclosure.

FIG. 13 is a diagram illustrating an example of a communication path according to a second modification of the present disclosure.

As illustrated in FIG. 13, it is assumed that the base station 40 can be connected to an external network (for example, WLAN), for example, via a core network of local 5G (not illustrated). In this case, the ONU 20 may set a communication path R3 connected to the external network via the base station 40 as one of the plurality of communication paths instead of the communication path R2.

That is, the ONU 20 sets a routing rule for selecting the communication path R1 or the communication path R3 based on the communication path quality requirement information acquired from the terminal device 30.

<<7. Third Modification>>

In the first to third embodiments and the first and second modifications described above, the ONU 20 is connected to the upstream network via the plurality of communication paths, but the present disclosure is not limited thereto. For example, the MDF board 10A may be connected to an upstream network (external network) via a plurality of communication paths.

Figure 14:
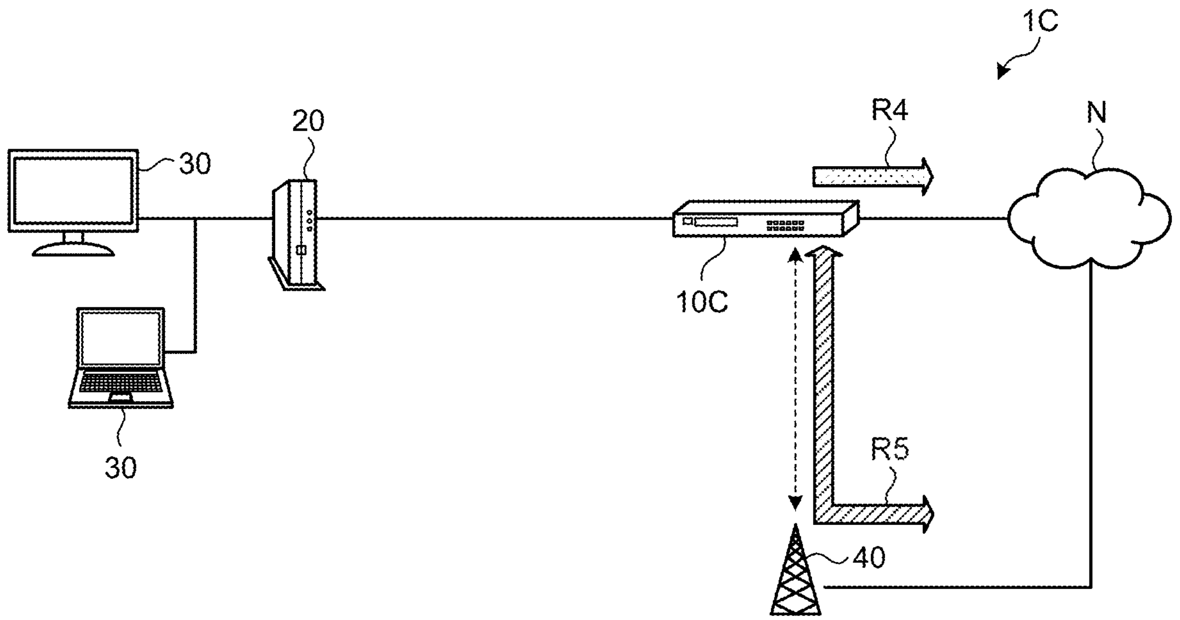
FIG. 14 is a diagram illustrating an example of a communication path according to a third modification of the present disclosure.

FIG. 14 is a diagram illustrating an example of a communication path according to a third modification of the present disclosure.

As illustrated in FIG. 14, it is assumed that the base station 40 can be connected to an external network (for example, WLAN), for example, via a core network of local 5G (not illustrated). In this case, an MDF board 10C relays traffic using either a communication path R4 connected to the external network via a wired network or a communication path R5 connected to the external network via the base station 40 (local 5G).

Figure 15:
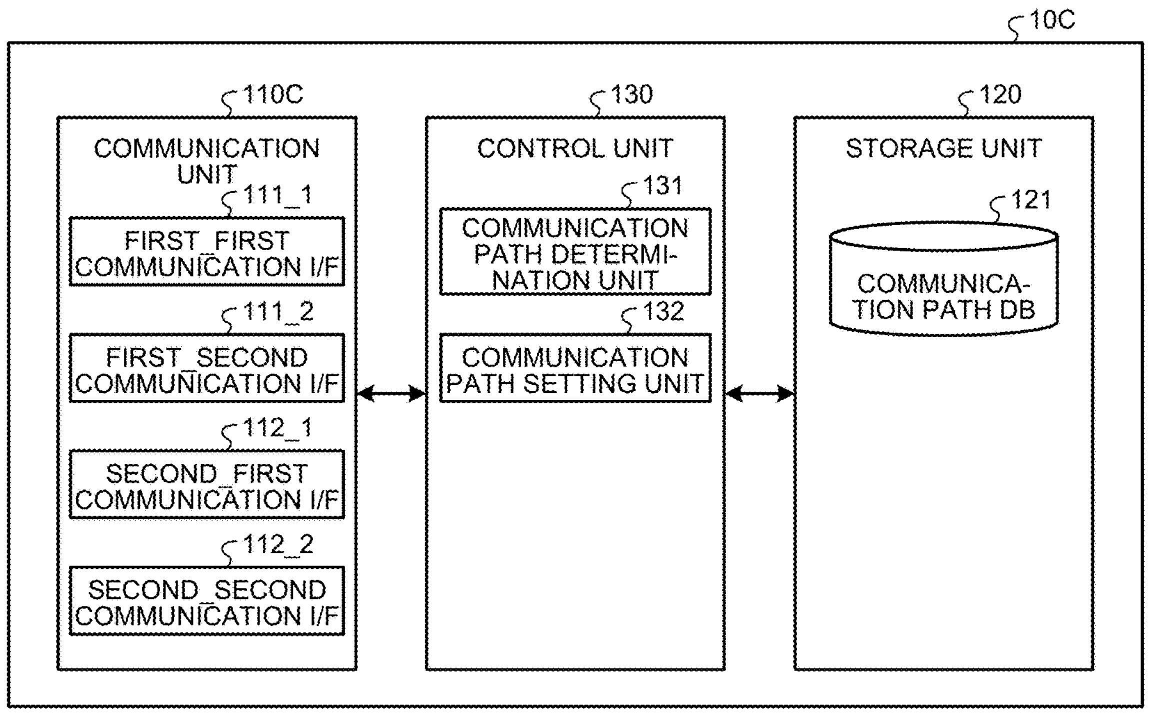
FIG. 15 is a block diagram illustrating a configuration example of an MDF board according to the third modification of the present disclosure.

FIG. 15 is a block diagram illustrating a configuration example of the MDF board 10C according to the third modification of the present disclosure. The MDF board 10C illustrated in FIG. 15 is different from the MDF board 10 in FIG. 3 in that a communication unit 110C includes a second_first communication I/F 112.1 and the second_second communication I/F 112.2 instead of the second communication I/F 112.

The second_first communication I/F 112.1 is, for example, an interface connected to the external network and has a function similar to that of the second communication I/F 112 in FIG. 3. The second_second communication I/F 112.2 is, for example, an interface connected to the local 5G via the base station 40.

The communication path setting unit 132 selects a communication path to be connected to the external network from among the communication paths R4 and R5, for example, based on setting information acquired from the ONU 20, and sets a routing rule. For example, the communication path setting unit 132 may select the communication path R5 for a flow in which communication is performed via the base station 40 (the communication path R2) and select the communication path R4 for a flow in which communication is performed via the local line (the communication path R1).

Alternatively, the communication path setting unit 132 may acquire the communication path quality requirement information from the terminal device 30, for example, via the ONU 20 and set the routing rule based on the information. In this case, the communication path setting unit 132 can set the communication path similarly to the communication path setting unit 232 of the ONU 20.

Furthermore, the communication path setting unit 132 may update the communication path setting, for example, according to a communication status in which the ONU 20A performs analysis. Alternatively, for example, the communication path setting unit 132 may update the communication path setting according to the monitoring status of the throughput on the WAN side. In this case, the control unit 130 includes the analysis unit 133 (not illustrated) illustrated in FIG. 11.

In the example described above, the MDF board 10C sets the communication path of the upstream network, but the present disclosure is not limited thereto. For example, the terminal device 30 may select a communication path to be connected to the external network from among a plurality of communication paths.

Figure 16:
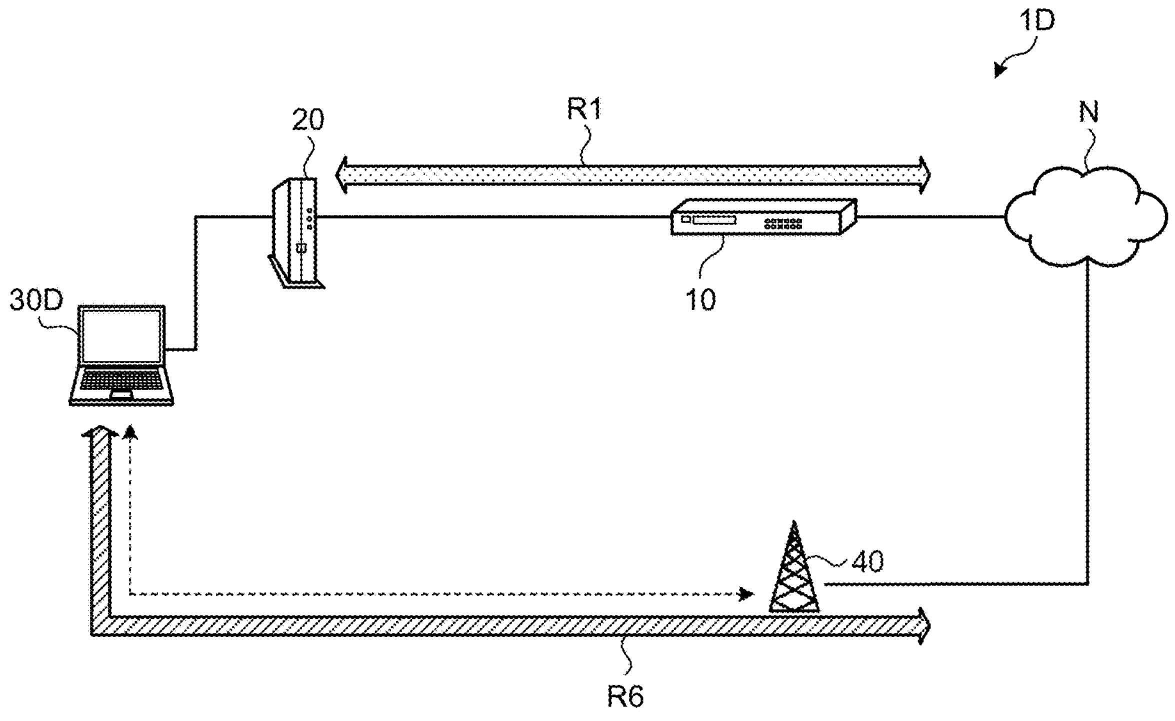
FIG. 16 is a diagram illustrating another example of the communication path according to the third modification of the present disclosure.

FIG. 16 is a diagram illustrating another example of the communication path according to the third modification of the present disclosure.

As illustrated in FIG. 16, it is assumed that the base station 40 can be connected to the external network (for example, WLAN), for example, via a core network of local 5G (not illustrated). In this case, a terminal device 30D performs communication using either the communication path R1 connected to the external network via the ONU 20 or a communication path R6 connected to the external network via the base station 40 (local 5G).

Figure 17:
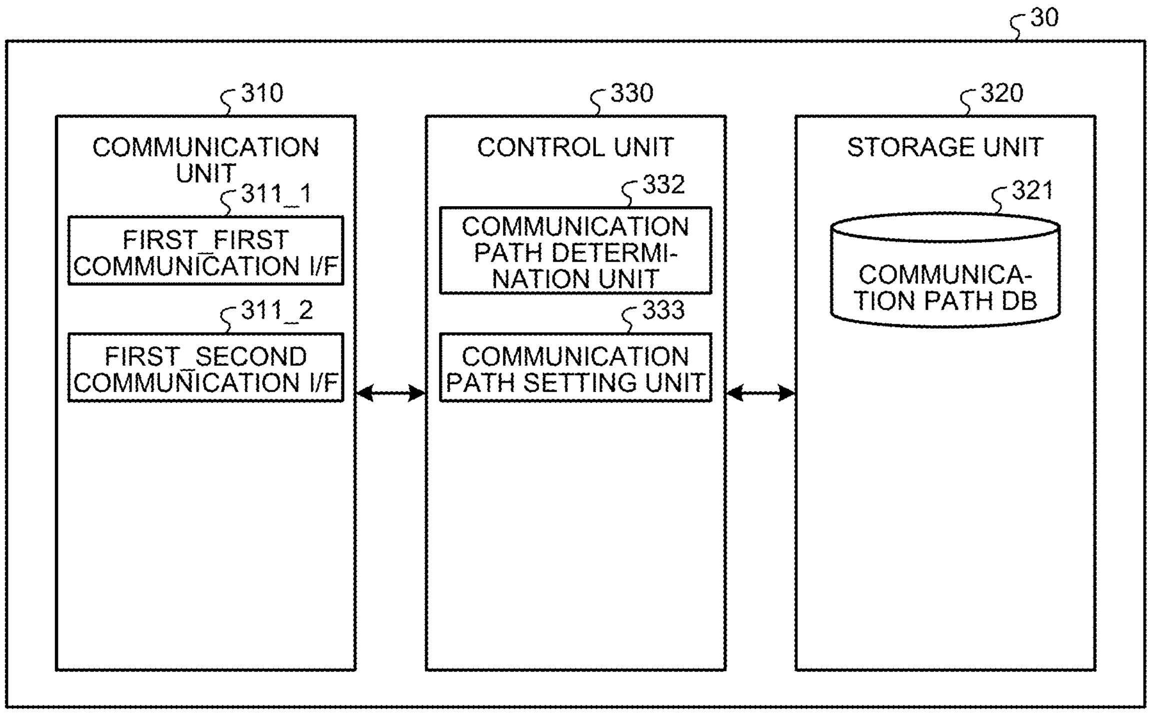
FIG. 17 is a block diagram illustrating a configuration example of a terminal device according to the third modification of the present disclosure.

FIG. 17 is a block diagram illustrating a configuration example of the terminal device 30D according to the third modification of the present disclosure. A communication unit 310D of the terminal device 30D illustrated in FIG. 17 includes a first_first communication I/F 311_1 and a first_second communication I/F 311.2. Furthermore, a storage unit 320D includes a communication path DB 321. A control unit 330D includes a communication path determination unit 332 and a communication path setting unit 333.

The first_first communication I/F 311_1 is, for example, an interface for communication with the ONU 20. The first_second communication I/F 311.2 is, for example, an interface connected to the local 5G via the base station 40.

The communication path DB 321 is a database that stores communication paths to the external network. The communication path DB 321 is used when the control unit 330D determines which of the plurality of communication paths R1 and R6 is used to connect to the external network. For example, the communication path DB 321 is a routing table.

The communication path determination unit 332 determines a communication path of data based on the communication path information (routing rule) stored in the communication path DB 321.

The communication path setting unit 333 sets the communication path based on the communication path quality required by the application executed, for example, by the application unit 340. The communication path setting unit 333 sets the communication path such that the communication path R6 via the local 5G on which stable communication can be performed is selected for communication with high priority such as communication that requires low delay and large capacity as in the video call application, and the communication path R1 including the local line is selected for the other communication with low priority.

Note that the communication path setting unit 333 may perform dynamic communication path setting, for example, according to the communication status acquired from the ONU 20. For example, when the upstream network is not congested, the communication path setting unit 333 sets the communication path so as to select the communication path R1 including the local line. On the other hand, when the upstream network is congested, the communication path setting unit 333 sets the communication path such that one of the communication paths R1 and R6 is selected according to the type of traffic or the like.

Note that the communication paths R1 to R6 described in the first to third embodiments and the first and second modifications are examples, and the communication system may select other communication paths. For example, the ONU 20 may be connected to the MDF board 10 via a public cellular communication network instead of the local 5G.

In addition, the plurality of communication paths used in the communication system are not limited to two communication paths. For example, the communication system may set the routing rule using three or more communication paths. The three or more communication paths may include the communication paths R1 to R6 described above or may include communication paths other than the communication paths R1 to R6.

8. Fourth Embodiment

In the third embodiment described above, the MDF board 10A predicts the current communication status, but the present disclosure is not limited thereto. For example, the MDF board 10A may predict the communication status in a predetermined period. Such a case is described as a fourth embodiment.

Figure 18:
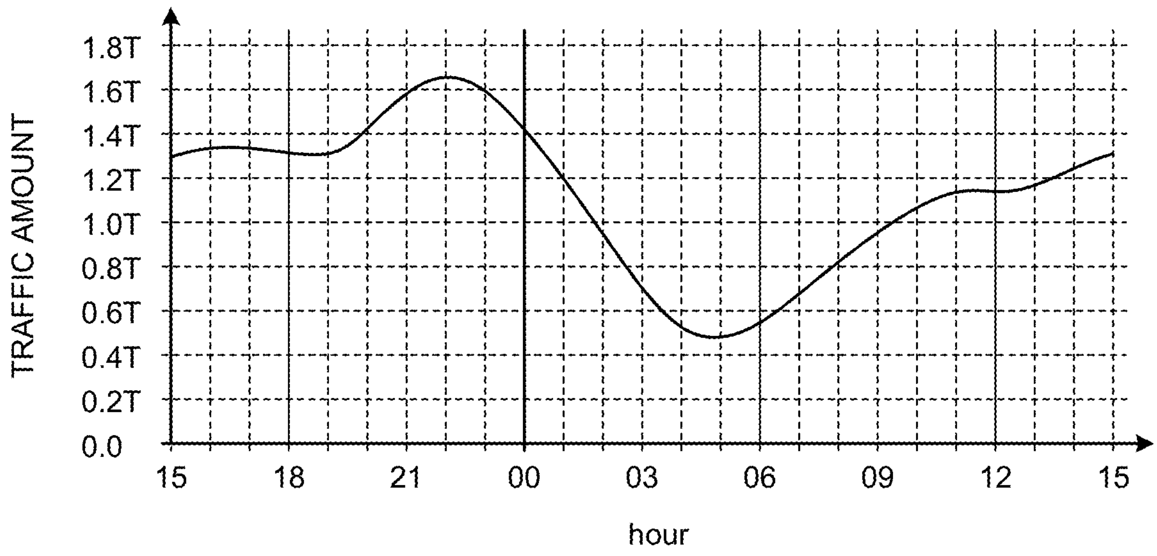
FIG. 18 is a diagram illustrating a communication status according to a fourth embodiment of the present disclosure.

FIG. 18 is a diagram illustrating a communication status according to the fourth embodiment of the present disclosure. In general, it is known that the network utilization rate has a daily periodicity or a weekly periodicity. As illustrated in FIG. 18, for example, the utilization rate becomes the highest around 21:00 to 23:00 and the utilization rate becomes the lowest around 3:00 to 6:00 in one day.

Therefore, for example, the MDF board 10A predicts a time zone in which use of the network increases (hereinafter, it is also referred to as a peak time zone) and instructs the ONU 20 to avoid performing communication requiring a large amount of data transfer, such as a game or an OS update while the peak time zone.

As a result, the MDF board 10A can further improve the network environment of the local line.

The MDF board 10A measures the total amount of traffic flowing from each house (each ONU 20) and learns a predictor (for example, a regression model) that sets the total amount of traffic as a correct label. As input parameters of the predictor, for example, the following parameters are provided.

Date and time

Date (day-of-the-week, weekday, weekend, holiday, and the like)

Weather

Presence or absence of event (game, OS update, live distribution, ticket reservation, and the like)

Usage status of neighboring cell

The MDF board 10A detects an event in which a large amount of data transfer occurs, such as a game or an OS update. The MDF board 10A may detect an event, for example, based on monitored traffic or may detect an event from the usage status of neighboring cells. Alternatively, the MDF board 10A may acquire information related to the event (for example, the date and time of update of the OS and the like) from the terminal device 30.

The MDF board 10A predicts the traffic amount in the time zone in which the event (for example, a game, an OS update, or the like) occurs using, for example, the predictor. In a case where the predicted traffic amount exceeds the upper limit of the throughput on the WAN side, the MDF board 10A notifies the ONU 20 to perform communication caused by the event in another time zone, for example, an off-peak time zone in which a utilization rate of the network is low.

The ONU 20 that receives such a notification instructs the terminal device 30 to perform communication (for example, a large amount of data transfer) that is generated by an event in the off-peak time zone, thereby changing the time of the communication. The terminal device 30 obtains, for example, permission from the user and performs communication generated by the event in the off-peak time zone.

Note that the prediction of the traffic amount described above is performed, for example, by a predictor mounted on the analysis unit 133 of the MDF board 10A illustrated in FIG. 11. In this case, the configuration of the analysis unit 133 may be, for example, the same as the configuration of the analysis unit 233 illustrated in FIG. 9.

Furthermore, in a case where the event that occurs is an event in which the time zone cannot be shifted, such as live distribution or ticket reservation, the MDF board 10A may request the ONU 20 to adjust other communication (flow rate limitation or change to off-peak time zone) instead of communication based on the event. Alternatively, the MDF board 10A may perform communication path setting according to the event, for example, by notifying the ONU 20 to perform communication related to the event via the local 5G.

Figure 19:
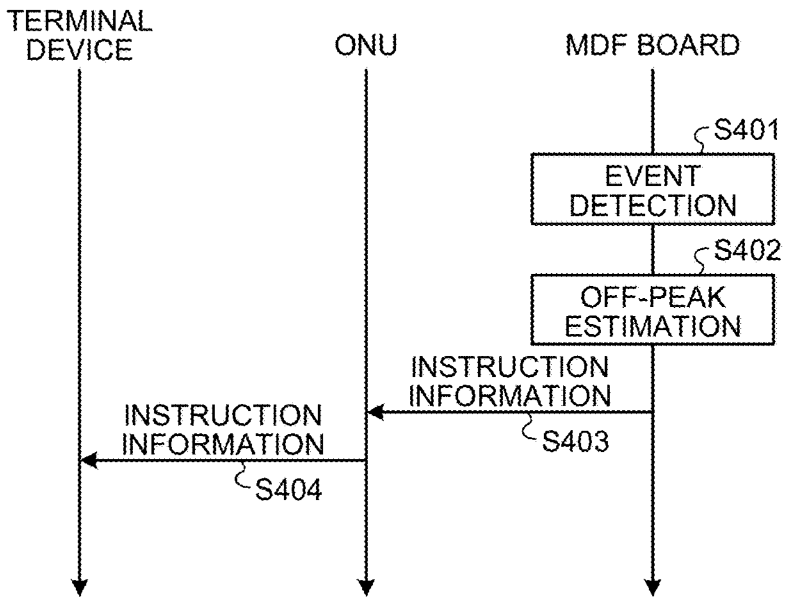
FIG. 19 is a sequence diagram illustrating a flow of communication processing according to the fourth embodiment of the present disclosure.

FIG. 19 is a sequence diagram illustrating a flow of communication processing according to the fourth embodiment of the present disclosure.

As illustrated in FIG. 19, when detecting an event in which the traffic amount exceeds the throughput upper limit value on the WAN side (step S401), the MDF board 10A estimates the off-peak time zone (step S402).

The MDF board 10A notifies the ONU 20 of information related to the off-peak time zone as instruction information (step S403). The ONU 20 notifies the terminal device 30 of the received instruction information (step S404). The terminal device 30 performs the event in the off-peak time zone based on the instruction information.

As described above, in the present embodiment, the MDF board 10A instructs to perform an event in which a large amount of data transfer occurs in the off-peak time zone, so that traffic can be smoothed and the network environment can be further improved.

Note that the MDF board 10A may predict the traffic amount after n hours instead of the off-peak time zone. In this case, for example, in a case where the MDF board 10A determines that the throughput upper limit value on the WAN side is not exceeded even if the event is performed in n hours based on the predicted traffic amount, the MDF board notifies the ONU 20 to perform the event in n hours.

<<9. Fourth Modification>>

In the fourth embodiment described above, the MDF board 10A predicts the traffic amount, but in addition to this, the MDF board 10A may detect an abnormal value of the traffic amount.

For example, the MDF board 10A compares the predicted value of the throughput with the actual value and detects that the throughput is an abnormal value when the actual value is larger than the predicted value by a predetermined threshold or more. For example, when the throughput predicted by the MDF board 10A is 100 Mbps, if the current throughput is 150 Mbps, the MDF board 10A detects that the throughput is an abnormal value.

In this case, the MDF board 10A verifies, for example, the cause of the increase in traffic. For example, the MDF board 10A monitors a traffic amount for each I/F (each house (ONU 20)) and detects an I/F having traffic larger than the normal time.

Here, it is assumed that there is a house (the ONU 20) whose traffic is increased as compared with the normal time. The MDF board 10A determines whether the traffic amount on the WAN side exceeds a specified amount due to an increase in traffic of the house (the ONU 20).

When the traffic amount on the WAN side exceeds a specified amount due to an increase in the traffic of the house (the ONU 20), the MDF board 10A requests the house (the ONU 20) to reduce the traffic. At this time, the MDF board 10A may include, in the reduction request, information related to a port number of a flow with a large amount of data communication. Alternatively, shaping may be performed on the traffic of the house (the ONU 20).

The ONU 20 that receives the reduction request searches for a flow whose data usage amount is larger than the normal time. The ONU 20 performs shaping on the flow obtained by the search. Alternatively, the ONU 20 notifies the terminal device 30 of a traffic reduction or a flow interruption request.

Note that, in a case where the information related to the flow is included in the reduction request, the ONU 20 may perform shaping or a request to the terminal device 30 using the flow.

The terminal device 30 that acquires the traffic reduction or the flow interruption request requests interruption to the application that generates the flow. The application requests permission of interruption from the user and interrupts the flow when the permission of the interruption is obtained from the user.

When the flow is not interrupted or when the traffic amount is large even if the flow is interrupted, the ONU 20 switches important traffic (for example, traffic of a video call application) to a communication path (for example, the communication path R2 using local 5G) other than the local line (the communication path R1). This can be achieved by the ONU 20 rewriting the communication path DB 221.

<<10. Fifth Modification>>

In the fourth embodiment described above, the MDF board 10A acquires the input parameters and learns the predictor. Here, there is a risk that the input parameters include, for example, personal information related to residents of each house, such as at which timing and which application is used. Acquisition of such personal information by the MDF board 10A may be undesirable from the viewpoint of privacy protection of each house.

Therefore, in the present modification, the MDF board 10A learns the predictor using federated learning technology. The federated learning technology is a technology for performing learning by performing learning in each terminal and aggregating learning results in each terminal at the center. In the present modification, the MDF board 10A aggregates the learning results performed by the ONUs 20, so that the MDF board 10A performs learning of the predictor.

For example, the ONU 20 of each house learns the regression model for predicting traffic using a traffic amount actually used as a learning label and a predetermined parameter as an input. As the predetermined parameters, for example, the following parameters are provided.

Date and time

Date

Weather

Presence or absence of event

Port of used traffic

Type of application

The MDF board 10A acquires a result (for example, a regression model) learned by the ONU 20. The MDF board 10A aggregates the acquired learning results and learns the regression model for predicting the entire traffic.

Learning results are aggregated in the MDF board 10A, and personal information (for example, the usage amount of data, the type of application, and the like) of each house is not aggregated in the MDF board 10A. The MDF board 10A can learn a predictor without using the personal information.

The MDF board 10A performs the off-peak prediction and the abnormal value detection described above by using the learned predictor.

In the present modification, the ONU 20 learns the traffic amount. Therefore, the traffic amount can be predicted by using the model learned by the ONU 20. That is, the ONU 20 can predict whether the usage amount of each house exceeds the allowable amount of the local line (the communication path R1) by using the learning model.

When predicting that the usage amount of each house exceeds the allowable amount of the local line (the communication path R1), the ONU 20 may update the communication path setting and change the important traffic to another communication path (for example, the communication path R2 using local 5G).

As described above, by performing learning in each ONU 20 and aggregating learning results in the MDF board 10A, the ONU 20 and the MDF board 10A can adjust the traffic amount flowing through the local line and can further improve the network environment.

<<11. Sixth Modification>>

In the fourth embodiment described above, the MDF board 10A detects an event. The MDF board 10A that detects the event may create a cache server and store a specific file that is frequently accessed by the detected event. For example, the MDF board 10A stores a list of destination IPs and fully qualified domain names (FQDNs) to be routed. For example, when a data download request is made for the destination IP or FQDN more than a predetermined number of times, the MDF board 10A stores the downloaded data in the cache server. Thereafter, when receiving a download request of the data, the MDF board 10A transmits the cache content stored in the cache server to the request source.

<<12. Application Example>>

In the first to fourth embodiment and the first to fourth modifications described above, the case where the proposed technology of the present disclosure is applied to the system including the local lines constructed in the collective housing is described, but the application destination of the proposed technology of the present disclosure is not limited to the collective housing.

<12.1. Internal Network>

For example, the proposed technology of the present disclosure can be applied to a local area network (LAN) such as an internal network. For example, in the internal network, many employees pass an aggregation router from an access line and pass through a backbone network to the Internet. In addition, an employee who is doing telework accesses an internal network by using a virtual private network (VPN).

At this time, the traffic amount of the internal network may temporarily exceed the allowable amount, for example, a specific employee transmits a large amount of data to tighten the internal network. As a result, not only applications with loose time limits such as file transfer but also traffic requiring real-time properties such as VOIP communication may be difficult to communicate.

At this time, the higher router (corresponding to the MDF boards 10, 10A, and 10C described above) notifies the lower router (corresponding to the above-described ONUs 20 and 20A) of the communication path change request. When the lower router updates the communication path setting in response to the notification, the traffic can be prevented from flowing into the path in the congestion state.

In addition, an internal network system may cause communication of the Internet or communication of an application such as VOIP communication that does not need to be connected to an internal server to flow to a communication path directly connected to the Internet without passing through the internal network. As a result, the internal network system can reduce the utilization rate of the internal network.

For example, the VPN server monitors its own utilization rate, and in a case where the utilization rate exceeds a set utilization rate, the VPN server notifies a communication path change request to a client of the VPN (a PC of an employee) hanging under the VPN server. The client of the VPN that receives the notification does not cause all traffic to flow to the interface of the VPN but uses a communication path that does not use the VPN for traffic that can be bypassed, such as Internet communication. As a result, the internal network system can reduce the traffic amount of the VPN.

<12.2. Internet Service Provider (ISP)>

When event delivery or update occurs using the Internet, the Internet traffic may be used in a burst manner. In particular, the smartphone updates cause the access to concentrate in a short period of time.

Therefore, the core network (corresponding to the MDF boards 10, 10A, and 10C described above) of the ISP monitors the traffic and requests the ONU 20 or 20A of the subscriber to use another communication path when the traffic concentration is confirmed in the specific communication path.

The ONU 20 or 20A of each subscriber that receives the instruction uses specific traffic (for example, VOIP traffic)

on a sub-line (for example, a cellular line). Accordingly, the terminal device 30 can realize more stable communication.

<12.3. Different Line Business by Same Operator>

The same operator may manage both the fixed line business and the mobile carrier business. In this case, the corresponding operator can use the same core network and different access networks in the fixed line business and the mobile carrier business.

In such a case, by using the proposed technology of the present disclosure, the core network may notify the client (for example, the terminal device 30) of the communication path setting request to switch the access network according to the usage status of one access network.

For example, when the wired network (for example, a fixed line) is congested, the core network changes a part of the traffic to the wireless network (for example, a cellular line) according to the priority. Since the same operator manages both the fixed line business and the mobile carrier business, both lines can share the communication status. Therefore, when one line is congested, the core network can prompt the client to make a detour to the other line, and the network environment can be further improved.

In addition, when a large-scale event using the network occurs, the core network notifies a client (for example, the terminal device 30) to move communication by an application with low priority to an off-peak time zone. As a result, the core network can facilitate smoothing of network utilization, and the network environment can be further improved.

Here, the core network notifies the communication path setting request and the movement to the off-peak time zone, but the present disclosure is not limited thereto. The access network of each line may perform the notification.

<<13. Hardware Configuration>>

Figure 20:
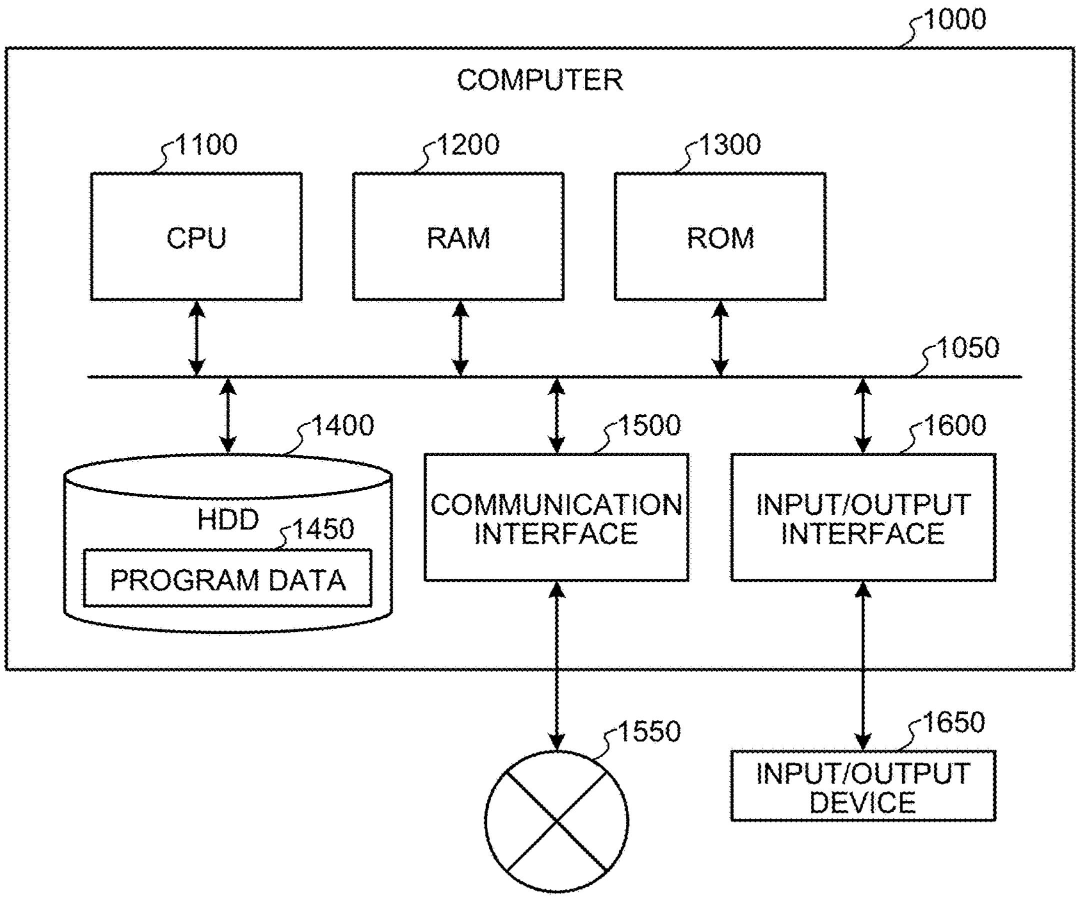
FIG. 20 is a hardware configuration diagram illustrating an example of a computer 1000 that realizes functions of the MDF board.

The information devices such as the MDF boards 10, 10A, and 10C, the ONUs 20 and 20A, and the terminal devices 30 and 30D according to the above-described embodiments are implemented by, for example, a computer 1000 having a configuration as illustrated in FIG. 20. Hereinafter, the MDF board 10 according to the embodiment is described as an example. FIG. 20 is a hardware configuration diagram illustrating an example of the computer 1000 that realizes functions of the MDF board 10. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050.

The CPU 1100 operates based on a program stored in the ROM 1300 or the HDD 1400 and controls each unit. For example, the CPU 1100 loads the program stored in the ROM 1300 or the HDD 1400 into the RAM 1200 and executes processing corresponding to various programs.

The ROM 1300 stores a boot program such as a basic input output system (BIOS) executed by the CPU 1100 at the time of activating the computer 1000, a program depending on hardware of the computer 1000, and the like.

The HDD 1400 is a computer-readable recording medium that records a program executed by the CPU 1100, data used by the program, and the like in a non-transitory manner. Specifically, the HDD 1400 is a recording medium that records an information processing program according to the present disclosure which is an example of program data 1450.

The communication interface 1500 is an interface for the computer 1000 to connect to an external network 1550 (for example, the Internet). For example, the CPU 1100 receives data from another device or transmits data generated by the CPU 1100 to another device via the communication interface 1500.

The input/output interface 1600 is an interface for connecting an input/output device 1650 and the computer 1000. For example, the CPU 1100 receives data from an input device such as a keyboard and a mouse via the input/output interface 1600. In addition, the CPU 1100 transmits data to an output device such as a display, a speaker, or a printer via the input/output interface 1600. Furthermore, the input/output interface 1600 may function as a media interface that reads a program or the like recorded in a predetermined recording medium (media). The medium is, for example, an optical recording medium such as a digital versatile disc (DVD) or a phase change rewritable disk (PD), a magneto-optical recording medium such as a magneto-optical disk (MO), a tape medium, a magnetic recording medium, or a semiconductor memory.

For example, when the computer 1000 functions as the MDF board 10 according to the embodiment, the CPU 1100 of the computer 1000 realizes the functions of the control unit 130 and the like by executing the information processing program loaded onto the RAM 1200. In addition, the HDD 1400 stores the information processing program according to the present disclosure and data in the storage unit 120. Note that the CPU 1100 reads the program data 1450 from the HDD 1400 and executes the program data, but as another example, these programs may be acquired from another device via the external network 1550.

14. Other Embodiments

The embodiments and modifications described above are examples, and various modifications and applications are possible.

For example, in each of the embodiments and modifications described above, the local line and the communication path via the local 5G have been described as the plurality of communication paths, but the communication path connecting the terminal devices 30 and 30D (or an ONU 20 and 20A) and the WAN is not limited thereto. For example, instead of the local 5G (alternatively, in addition to the local 5G), a communication path via the public 5G may be set. Note that the public 5G is, for example, a public 5G service that can be used by a user who has a contract with a mobile phone operator.

For example, in the embodiments and the modifications described above, the terminal devices 30 and 30D perform communication by switching bearers according to the priority of the flow by the ONUs 20 and 20A and the like selecting different communication paths, but the present disclosure is not limited thereto. For example, each entity included in the communication systems 1 to 1D may switch a logical communication path instead of/in addition to a physical communication path.

For example, the terminal devices 30 and 30D may switch the communication path by switching the network slice or the overlay network in addition to switching the bearer. Alternatively, the terminal devices 30 and 30D may switch the communication path by designating quality of service (QoS) in a type of service (ToS) field.

In addition, the ONUs 20 and 20A and/or the MDF boards 10, 10A, and 10C may not only switch the communication path by switching the communication I/F but also switch the communication path by switching, for example, the following.

Network slice
Overlay network
Virtual LAN (VLAN)
Tunneling protocol (Ipsec (Security Architecture for IP) and Generic Routing Encapsulation (GRE))

In addition, the ONUs 20 and 20A and/or the MDF boards 10, 10A, and 10C may switch the communication paths by switching between the local 5G and the public 5G described above. That is, both the local 5G and the public 5G may be included in the plurality of communication paths.

Among the processes described in the above embodiments and the modifications, all or a part of the processes described as being performed automatically can be performed manually, or all or a part of the processes described as being performed manually can be performed automatically by a known method. In addition, the processing procedure, specific names, and information including various data and parameters disclosed in the document and the drawings can be arbitrarily changed unless otherwise specified. For example, the various types of information illustrated in each figure are not limited to the illustrated information.

In addition, each component of each device illustrated in the drawings is functionally conceptual and is not necessarily physically configured as illustrated in the drawings. That is, a specific form of distribution and integration of each device is not limited to the illustrated form, and all or a part thereof can be configured to be functionally or physically distributed and integrated in an arbitrary unit according to various loads, usage statuses, and the like. Note that this configuration by distribution and integration may be performed dynamically.

In addition, the embodiments and modifications described above can be appropriately combined in a region in which the processing contents do not contradict each other. Furthermore, the order of each step illustrated in the flowchart according to the embodiment described above can be changed as appropriate.

Furthermore, for example, the embodiments and modifications can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the embodiments and the modifications, the system means a set of a plurality of components (such as devices or modules (parts)), and it does not matter whether all the components are in the same housing. Therefore, a plurality of devices that are stored in separate housings and connected via a network and one device in which a plurality of modules are stored in one housing are both systems.

Furthermore, for example, the embodiments and the modifications can adopt a configuration of cloud computing in which one function is shared and processed by a plurality of devices in cooperation via a network.

15. Conclusion

Although the embodiments and the modifications of the present disclosure have been described above, the technical scope of the present disclosure is not limited to the embodiments and the modifications described above as they are, and various modifications can be made without departing from the gist of the present disclosure. In addition, components of different embodiments and modifications may be appropriately combined.

Furthermore, the effects of the embodiments and the modifications described in the present specification are merely examples and are not limited, and other effects may be provided.

Note that the present technology can also have the following configurations.

(1)

A relay device that is connected to an upstream network via a plurality of communication paths and relays communication between the upstream network and a downstream network, the relay device comprising:

a control unit that acquires communication status of at least one of the plurality of communication paths;
selects one of the plurality of communication paths depending on the communication status; and
is connected to the upstream network by using the selected communication path.

(2)

The relay device according to (1), wherein the control unit selects one of the plurality of communication paths based on a communication quality requirement acquired from a communication device connected via the downstream network.

(3)

The relay device according to (2), wherein, in a case where the communication quality requirement from the communication device cannot be satisfied when the communication path from which the communication status is acquired is used, the control unit changes the communication path used for relaying communication between the communication device and the upstream network.

(4)

The relay device according to (3), wherein, in a case where the communication quality requirement from the communication device cannot be satisfied when the communication path from which the communication status is acquired is used, and the communication status does not satisfy the communication quality even if a traffic using the communication path is adjusted, the control unit changes the communication path.

(5)

The relay device according to (3) or (4), wherein, according to the communication quality requirement, the control unit uses a first communication path among the plurality of communication paths regardless of the communication status in communication of a first traffic, and uses a second communication path different from the first communication path when the communication quality requirement can be satisfied from the communication status, and performs communication using the first communication path when the communication quality requirement cannot be satisfied in communication of a second traffic.

(6)

The relay device according to any one of (1) to (5), wherein the control unit is connected to a first relay device via at least one of the plurality of communication paths to be connected to the upstream network and selects one of the plurality of communication paths based on notification from the first relay device.

(7)

The relay device according to (6), wherein the control unit changes time of the communication based on an instruction from the first relay device.

(8)

The relay device according to any one of (1) to (7), wherein the control unit predicts communication status of at least one of the plurality of communication paths by using a prediction model and selects one of the plurality of communication paths based on a prediction result.

(9)

The relay device according to any one of (1) to (8), further comprising:

a plurality of communication interfaces respectively corresponding to the plurality of communication paths, wherein the control unit selects one of the plurality of communication interfaces according to the communication status.

(10)

The relay device according to any one of (1) to (9), wherein the plurality of communication paths include a plurality of logical communication paths.

(11)

The relay device according to any one of (1) to (10), wherein the plurality of communication paths include a wired communication path disposed in a collective housing and a wireless communication path having a communication area in the collective housing.

(12)

A relay method of making connection to an upstream network via a plurality of communication paths and relaying communication between the upstream network and a downstream network, the relay method comprising:

acquiring communication status of at least one of the plurality of communication paths;

selecting one of the plurality of communication paths depending on the communication status; and connecting to the upstream network by using the selected communication path.

(13)

A communication system comprising:

a first relay device that is connected to an upstream network via a plurality of communication paths and relays communication between the upstream network and a downstream network;

a second relay device that relays at least one of the plurality of communication paths and the upstream network; and a communication device that is connected to the downstream network, wherein the first relay device includes a control unit that acquires communication status of at least one of the plurality of communication paths, selects one of the plurality of communication paths depending on the communication status, and is connected to the upstream network by using the selected communication path.

(14)

A relay device that relays communication of a communication device connected to a downstream network by relaying communication between an upstream network and the downstream network, the relay device including:

a control unit that acquires at least one of a communication status of the downstream network and a communication status of the upstream network, and notifies the communication device of a communication path change instruction to change a communication path connected to the upstream network according to the communication status.

(15)

The relay device according to (14), in which the control unit notifies the communication device of a time change instruction to change time for performing the communication according to the communication status.

(16)

The relay device according to (15), in which the control unit predicts the communication status at predetermined time using a prediction model and notifies the time change instruction based on a prediction result.

(17)

The relay device according to (16), in which the control unit learns the prediction model based on a past communication status.

(18)

The relay device according to (16), in which the control unit generates the prediction model by aggregating learning models learned by the communication device.

(19)

A communication device that connects to an external network via a relay device, the communication device including:

a control unit that changes a communication path connected to the external network based on instruction information notified by the relay device according to a communication status between the relay device and the communication device.

(20)

The communication device according to (19), in which the control unit notifies the relay device of a quality requirement related to quality required for communication, and the relay device notifies the instruction information when the quality requirement cannot be satisfied in the communication status.

REFERENCE SIGNS LIST

1 COMMUNICATION SYSTEM
10 MDF BOARD
20 ONU
30 TERMINAL DEVICE
40 BASE STATION
110, 210, 310 COMMUNICATION UNIT
120, 220, 320 STORAGE UNIT
121, 221, 321 COMMUNICATION PATH DB
130, 230, 330 CONTROL UNIT
131, 231, 332 COMMUNICATION PATH DETERMINATION UNIT
132, 232, 333 COMMUNICATION PATH SETTING UNIT
133, 233 ANALYSIS UNIT
134 INSTRUCTION UNIT
331 NOTIFICATION UNIT
340 APPLICATION UNIT

The invention claimed is:

1. A first relay device that is connected to an upstream network via a plurality of communication paths and relays communication between the upstream network and a downstream network, the first relay device comprising:

processing circuitry configured to acquire a communication status of at least one of the plurality of communication paths including receiving throughput information indicating that a traffic amount on the at least one of the plurality of communication paths exceeds a throughput on the upstream network from a second relay device;

adjust traffic flowing through the first relay device according to a communication quality requirement and a priority based upon the throughput information indicating that the traffic amount on the at least one of the plurality of communication paths exceeds the throughput on the upstream network;

determine that the adjusted traffic exceeds the throughput on the upstream network;

select one of the plurality of communication paths depending on the communication status including updating a communication path setting based on the determination that the adjusted traffic exceeds the throughput on the upstream network;

connect to the upstream network by using the selected communication path;

receive instruction information related to an estimated off-peak time zone from the second relay device that detects an event and is connected to the upstream network; and instruct a terminal device on the downstream network to change a time of a communication generated by the detected event to the estimated off-peak time zone based on the instruction information.

2. The first relay device according to claim 1, wherein the communication quality requirement is acquired from the terminal device connected via the downstream network.

3. The first relay device according to claim 2, wherein, in a case where the communication quality requirement from the terminal device cannot be satisfied when the communication path from which the communication status is acquired is used, the processing circuitry is configured to change the communication path used for relaying communication between the terminal device and the upstream network.

4. The first relay device according to claim 3, wherein, according to the communication quality requirement, the processing circuitry is configured to:

use a first communication path among the plurality of communication paths regardless of the communication status in communication of a first traffic, use a second communication path different from the first communication path when the communication quality requirement can be satisfied from the communication status, and perform communication using the first communication path when the communication quality requirement cannot be satisfied in communication of a second traffic.

5. The first relay device according to claim 1, wherein the processing circuitry is configured to:

predict a future communication status of at least one of the plurality of communication paths by using a prediction model, and select one of the plurality of communication paths based on a prediction result.

6. The first relay device according to claim 1, further comprising:

a plurality of communication interfaces respectively corresponding to the plurality of communication paths, wherein the processing circuitry is configured to select one of the plurality of communication interfaces according to the communication status.

7. The first relay device according to claim 1, wherein the plurality of communication paths include a plurality of logical communication paths.

8. The first relay device according to claim 1, wherein the plurality of communication paths include a wired communication path disposed in a collective housing and a wireless communication path having a communication area in the collective housing.

9. The first relay device according to claim 1, wherein the processing circuitry is configured to adjust the traffic flowing through the first relay device by:

notifying the terminal device of a communication interruption request, and terminating or postponing a flow of the traffic when a permission is obtained from the terminal device in response to the communication interruption request.

10. The first relay device according to claim 1, wherein the processing circuitry is configured to:

generate a learning model by performing machine learning using a traffic amount on the plurality of communication paths as a learning label, and transmit the generated learning model to the second relay device for aggregation in a federated learning process.

11. A relay method of making connection to an upstream network via a plurality of communication paths and relaying communication between the upstream network and a downstream network performed by a first relay device, the relay method comprising:

acquiring a communication status of at least one of the plurality of communication paths including receiving throughput information indicating that a traffic amount on the at least one of the plurality of communication paths exceeds a throughput on the upstream network from a second relay device;

adjusting traffic flowing through the first relay device according to a communication quality requirement and a priority based upon the throughput information indicating that the traffic amount on the at least one of the plurality of communication paths exceeds the throughput on the upstream network;

determining that the adjusted traffic exceeds the throughput on the upstream network;

selecting one of the plurality of communication paths depending on the communication status including updating a communication path setting based on the determination that the adjusted traffic exceeds the throughput on the upstream network;

connecting to the upstream network by using the selected communication path;

receiving instruction information related to an estimated off-peak time zone from the second relay device that detects an event and is connected to the upstream network; and instructing a terminal device on the downstream network to change a time of a communication generated by the detected event to the estimated off-peak time zone based on the instruction information.

12. A communication system comprising:

a first relay device that is connected to an upstream network via a plurality of communication paths and relays communication between the upstream network and a downstream network;

a second relay device that relays at least one of the plurality of communication paths and the upstream network; and a terminal device that is connected to the downstream network, wherein the first relay device includes processing circuitry configured to acquire a communication status of at least one of the plurality of communication paths including receiving throughput information indicating that a traffic amount on the at least one of the plurality of communication paths exceeds a throughput on the upstream network from the second relay device;

adjust traffic flowing through the first relay device according to a communication quality requirement and a priority based upon the throughput information indicating that the traffic amount on the at least one of the plurality of communication paths exceeds the throughput on the upstream network;

determine that the adjusted traffic exceeds the throughput on the upstream network;

select one of the plurality of communication paths depending on the communication status including updating a communication path setting based on the determination that the adjusted traffic exceeds the throughput on the upstream network;

connect to the upstream network by using the selected communication path;

receive instruction information related to an estimated off-peak time zone from the second relay device that detects an event and is connected to the upstream network; and instruct the terminal device on the downstream network to change a time of a communication generated by the detected event to the estimated off-peak time zone based on the instruction information.

13. The communication system according to claim 12, wherein the second relay device creates a cache server, stores a specific file frequently accessed during the detected event in the cache server, and transmits a cache content of the specific file stored in the cache server to the terminal device when receiving a download request for the specific file.

14. The communication system according to claim 13, wherein the second relay device stores a list of destination Internet Protocols (IPs) and Fully Qualified Domain Names (FQDNs) to be routed to the cache server, and routes the download request to the cache server when a destination of the download request matches the list.

15. The communication system according to claim 14, wherein the processing circuitry is configured to:

generate a learning model by performing machine learning using a traffic amount on the plurality of communication paths as a learning label and a date, a time, and a weather as input parameters; and transmit the generated learning model to the second relay device for aggregation in a federated learning process, and the second relay device is configured to:

predict a future traffic amount by using the learning model;

compare the future traffic amount predicted by the learning model with an actual traffic amount; and detect the event as an abnormal value when the actual traffic amount is larger than the future traffic amount predicted by the learning model by a predetermined threshold or more.

16. The communication system according to claim 12, wherein the detected event includes an update of an operating system of the terminal device, and the second relay device detects the event by acquiring a date and a time of the update of the operating system from the terminal device.

* * * * *